June 14, 1938. T. H. NIFONG 2,120,505
APPARATUS FOR APPLYING FLEXIBLE STRIPS TO RECEPTACLES
Filed Dec. 6, 1935 15 Sheets-Sheet 1

Inventor
Thomas H. Nifong
By
Attorney

June 14, 1938. T. H. NIFONG 2,120,505
APPARATUS FOR APPLYING FLEXIBLE STRIPS TO RECEPTACLES
Filed Dec. 6, 1935 15 Sheets-Sheet 2

Thomas H. Nifong.

June 14, 1938. T. H. NIFONG 2,120,505
APPARATUS FOR APPLYING FLEXIBLE STRIPS TO RECEPTACLES
Filed Dec. 6, 1935 15 Sheets-Sheet 5

Inventor
Thomas H. Nifong
By B. P. Inkbern
Attorney

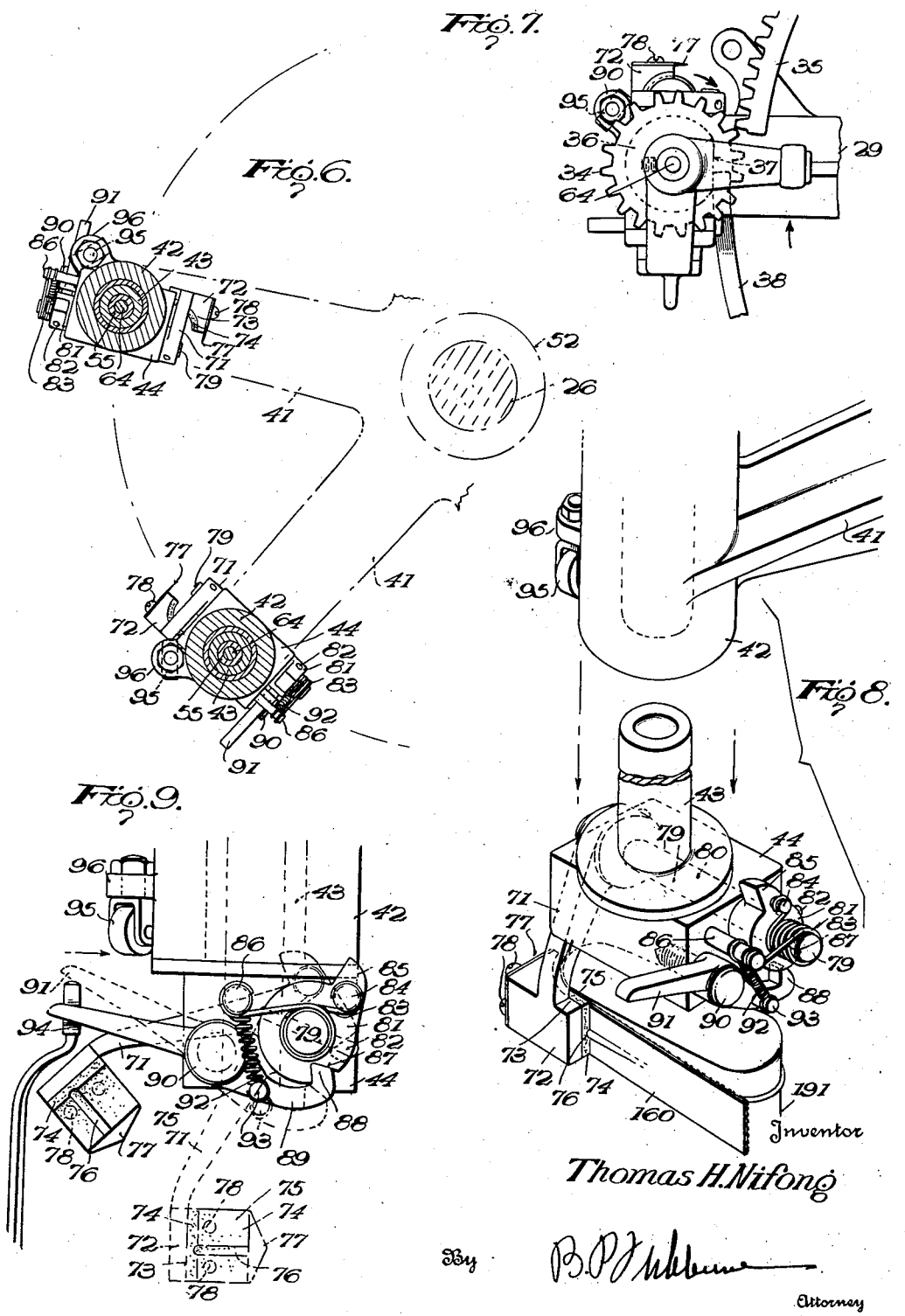

June 14, 1938.  T. H. NIFONG  2,120,505
APPARATUS FOR APPLYING FLEXIBLE STRIPS TO RECEPTACLES
Filed Dec. 6, 1935  15 Sheets-Sheet 7
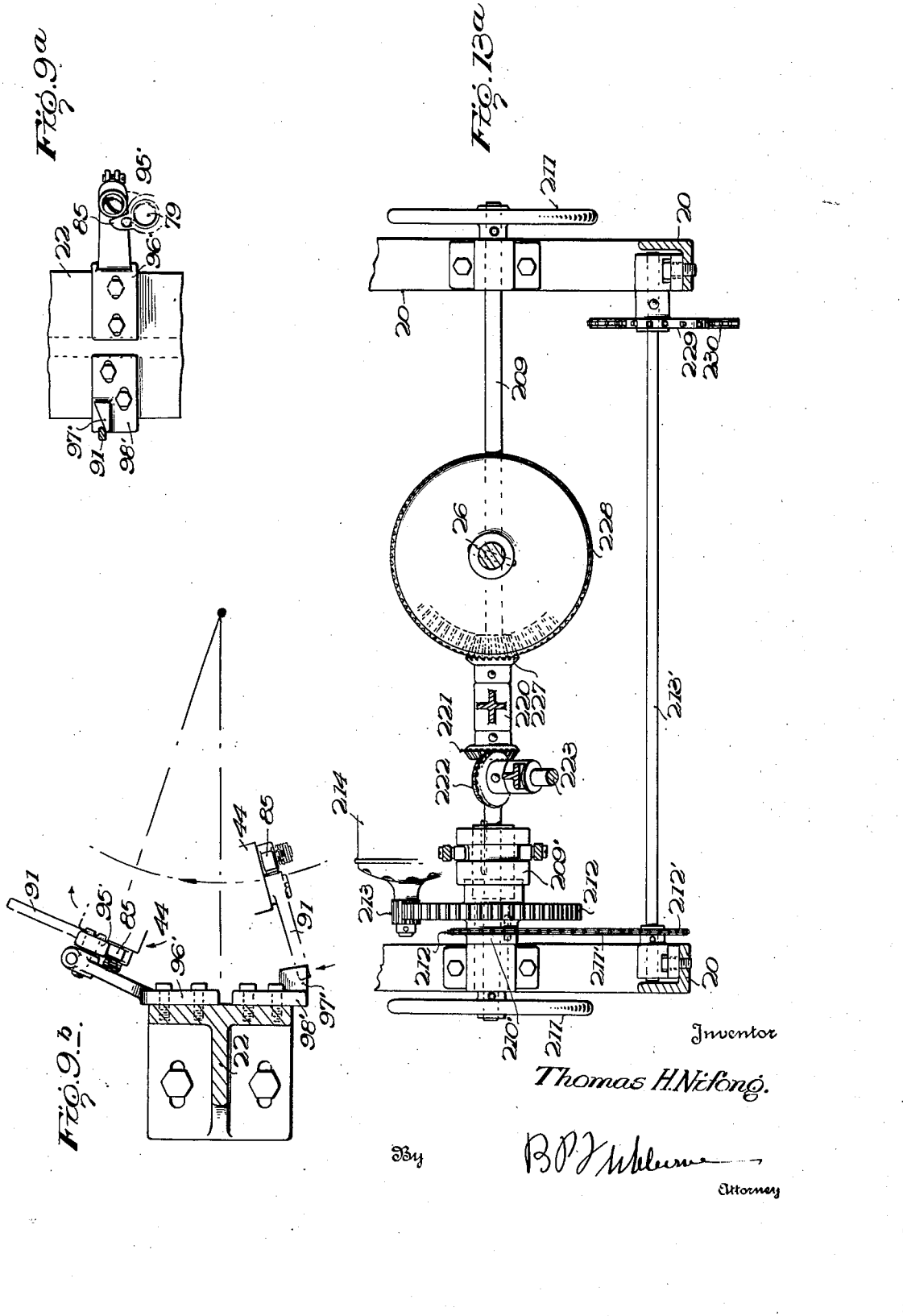

June 14, 1938.  T. H. NIFONG  2,120,505
APPARATUS FOR APPLYING FLEXIBLE STRIPS TO RECEPTACLES
Filed Dec. 6, 1935  15 Sheets-Sheet 8
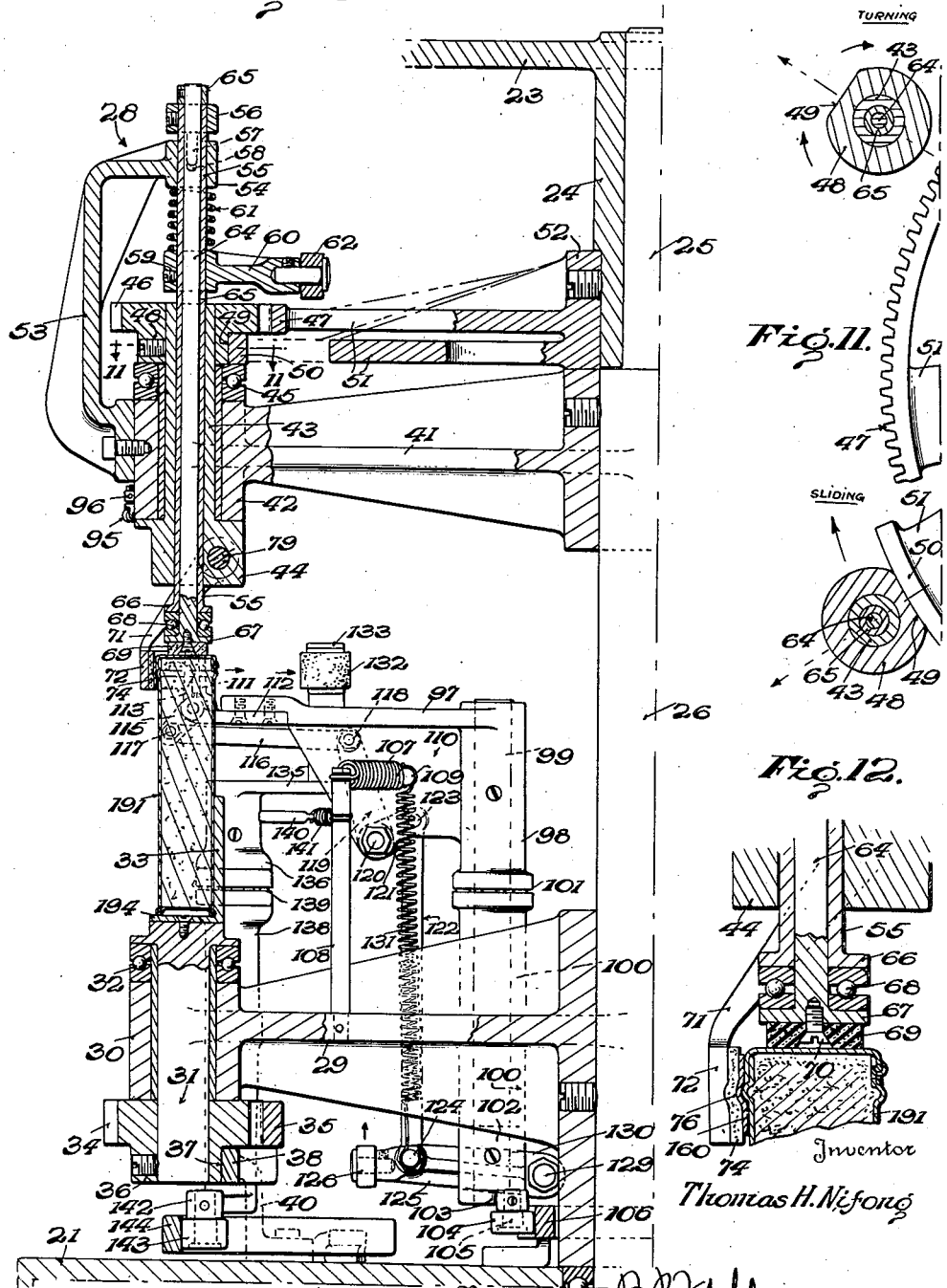
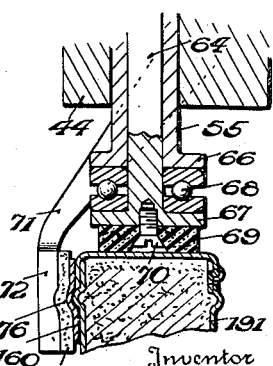
Inventor
Thomas H. Nifong

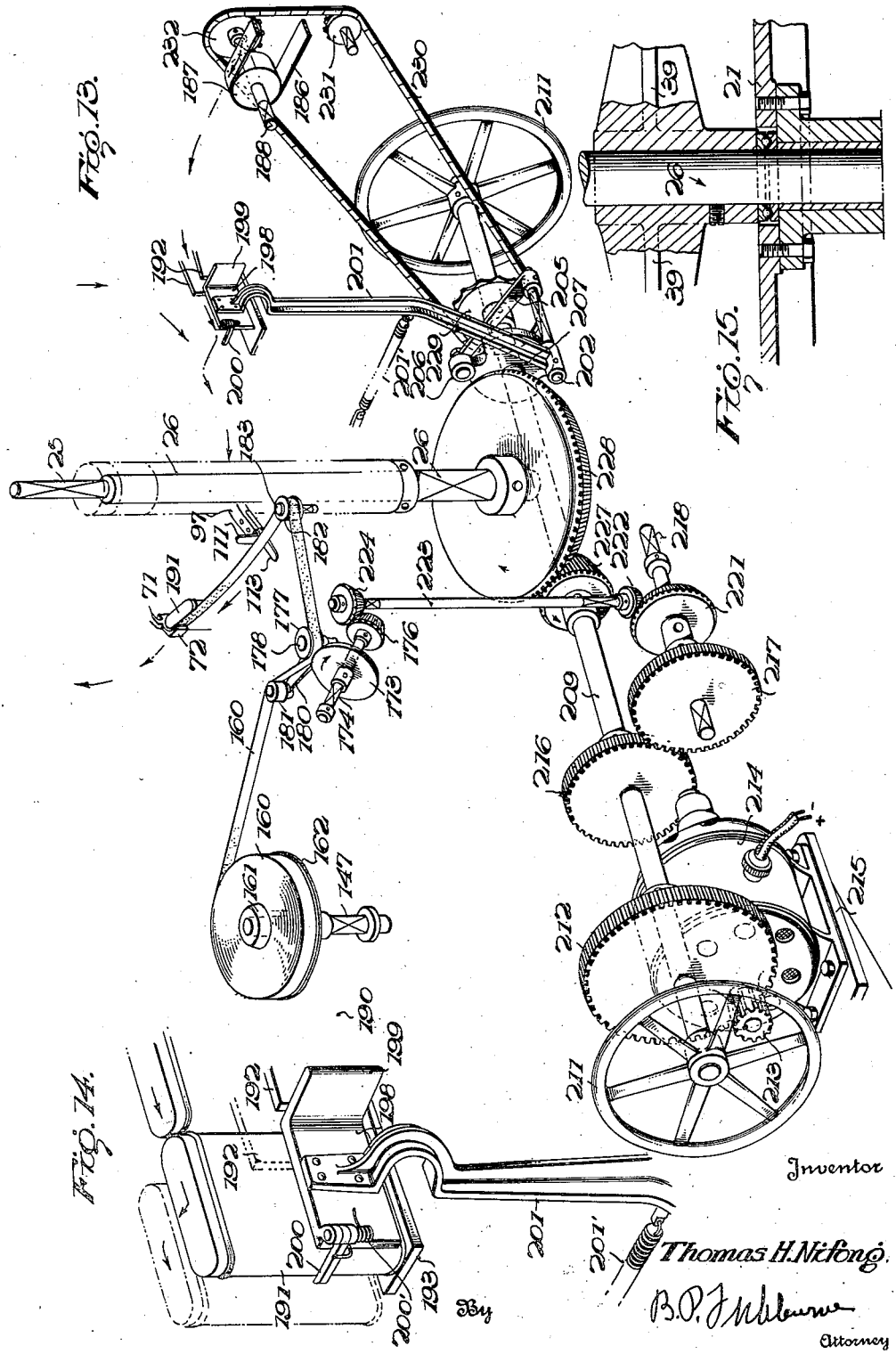

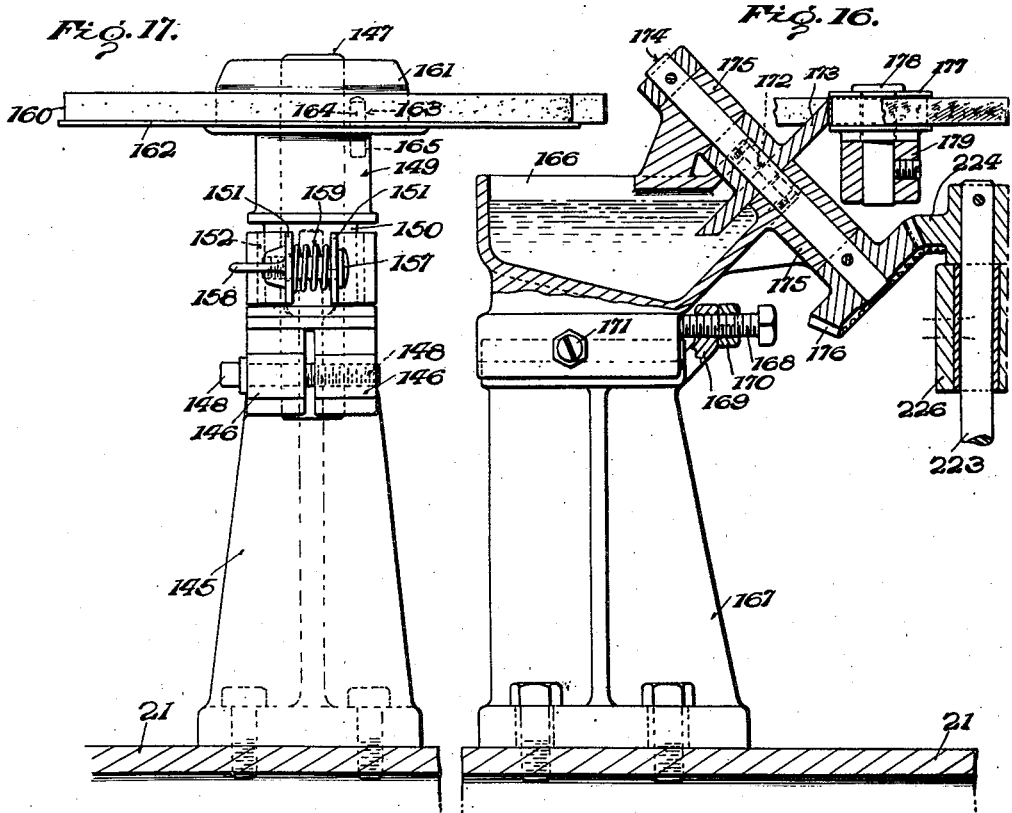

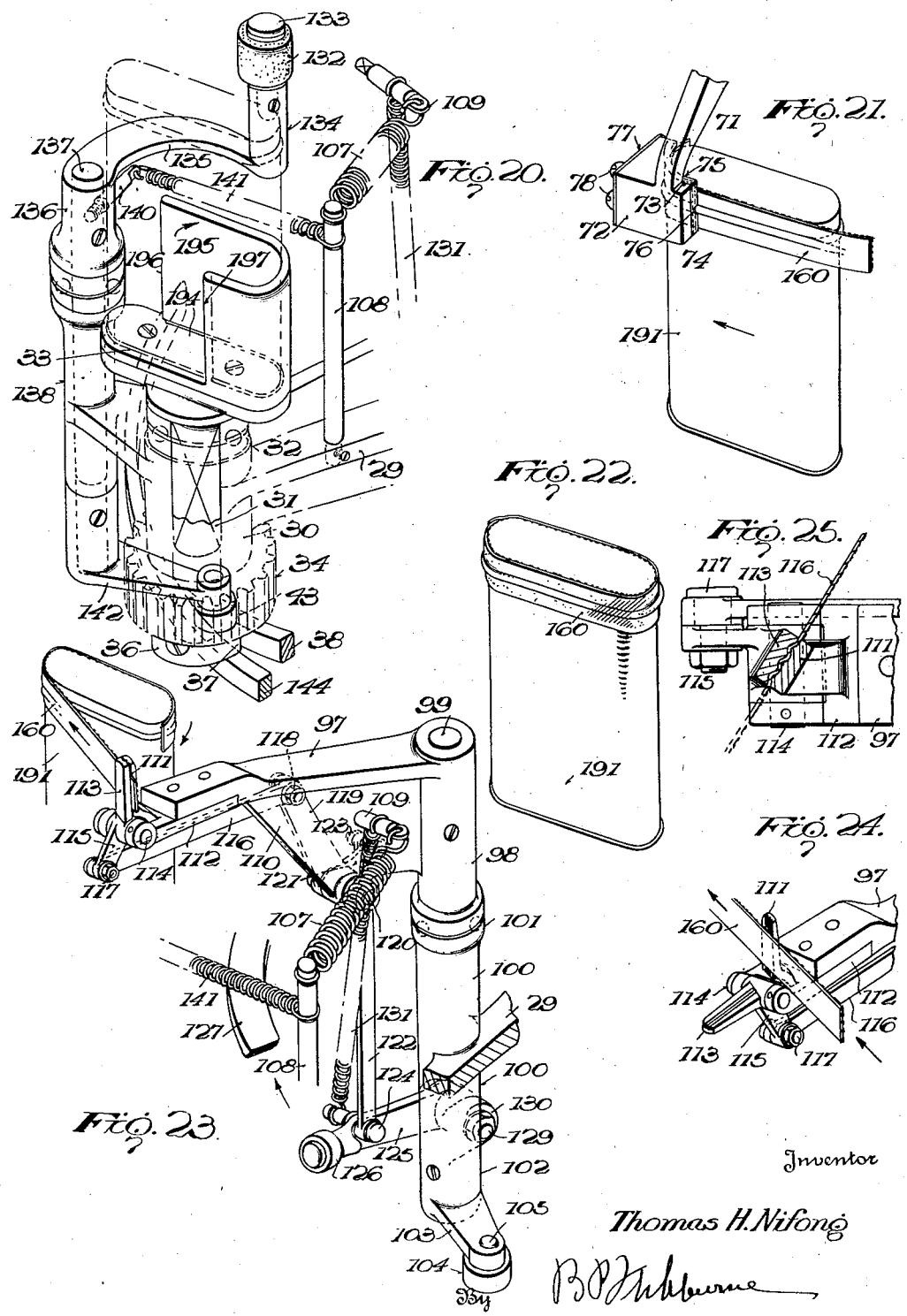

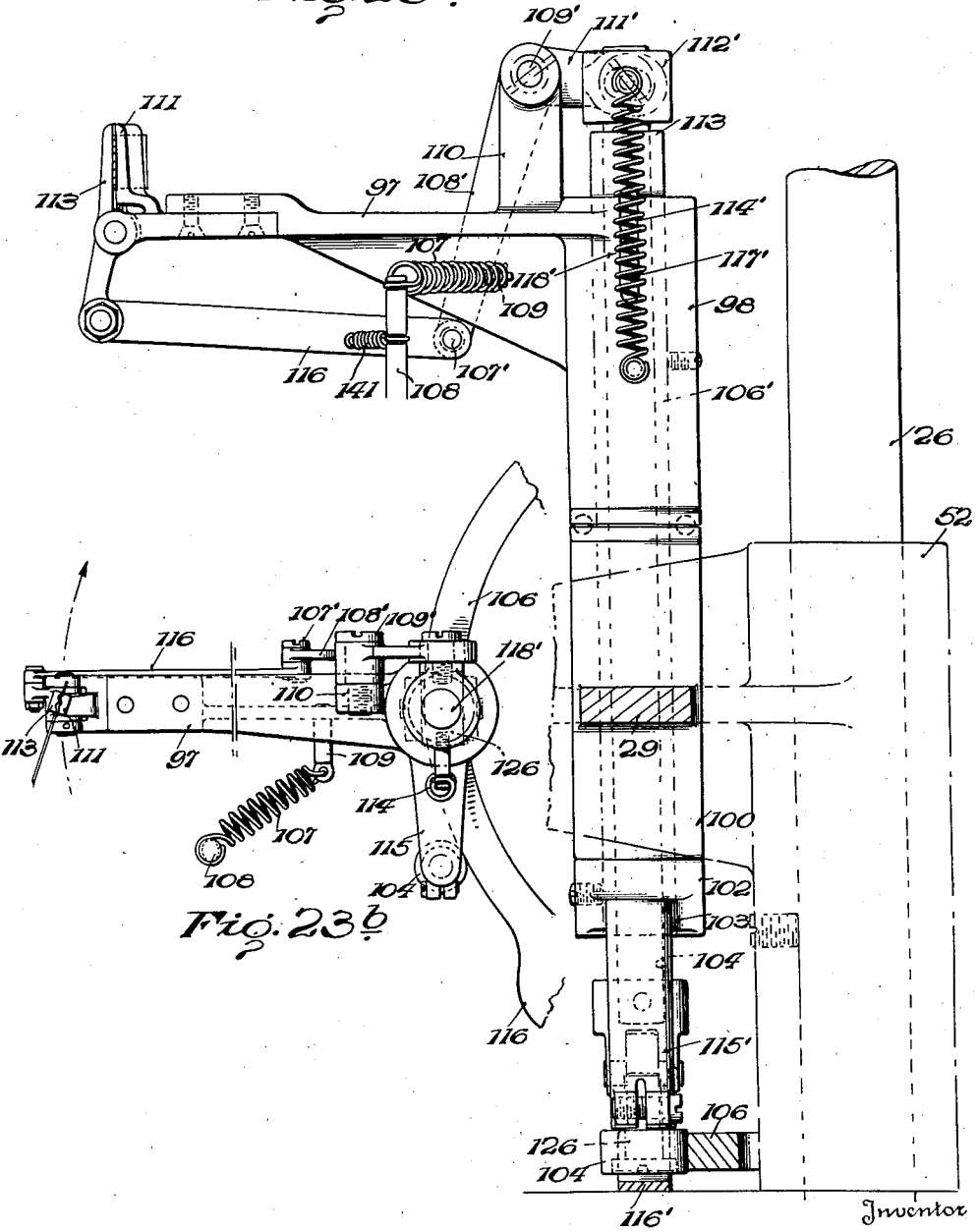

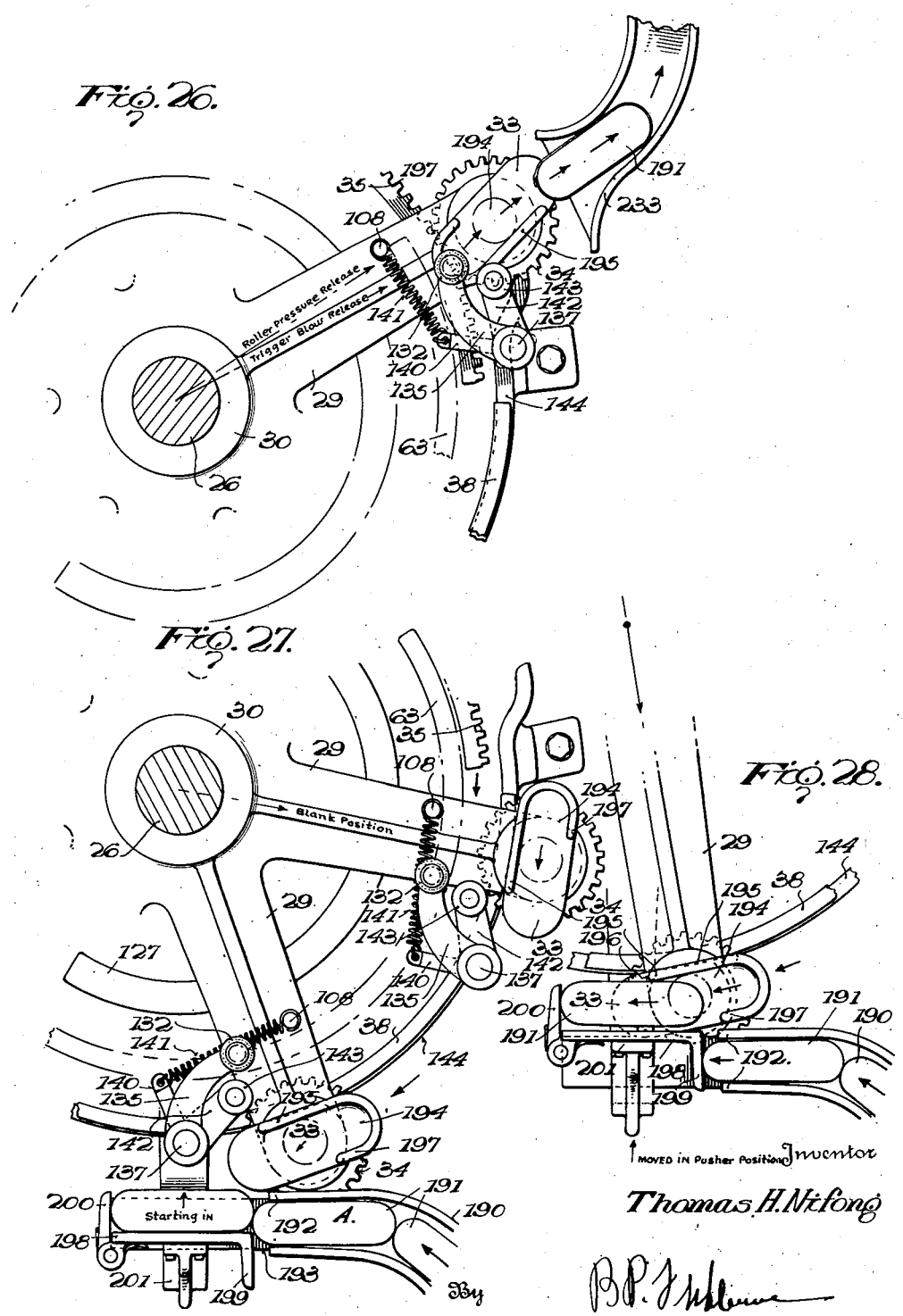

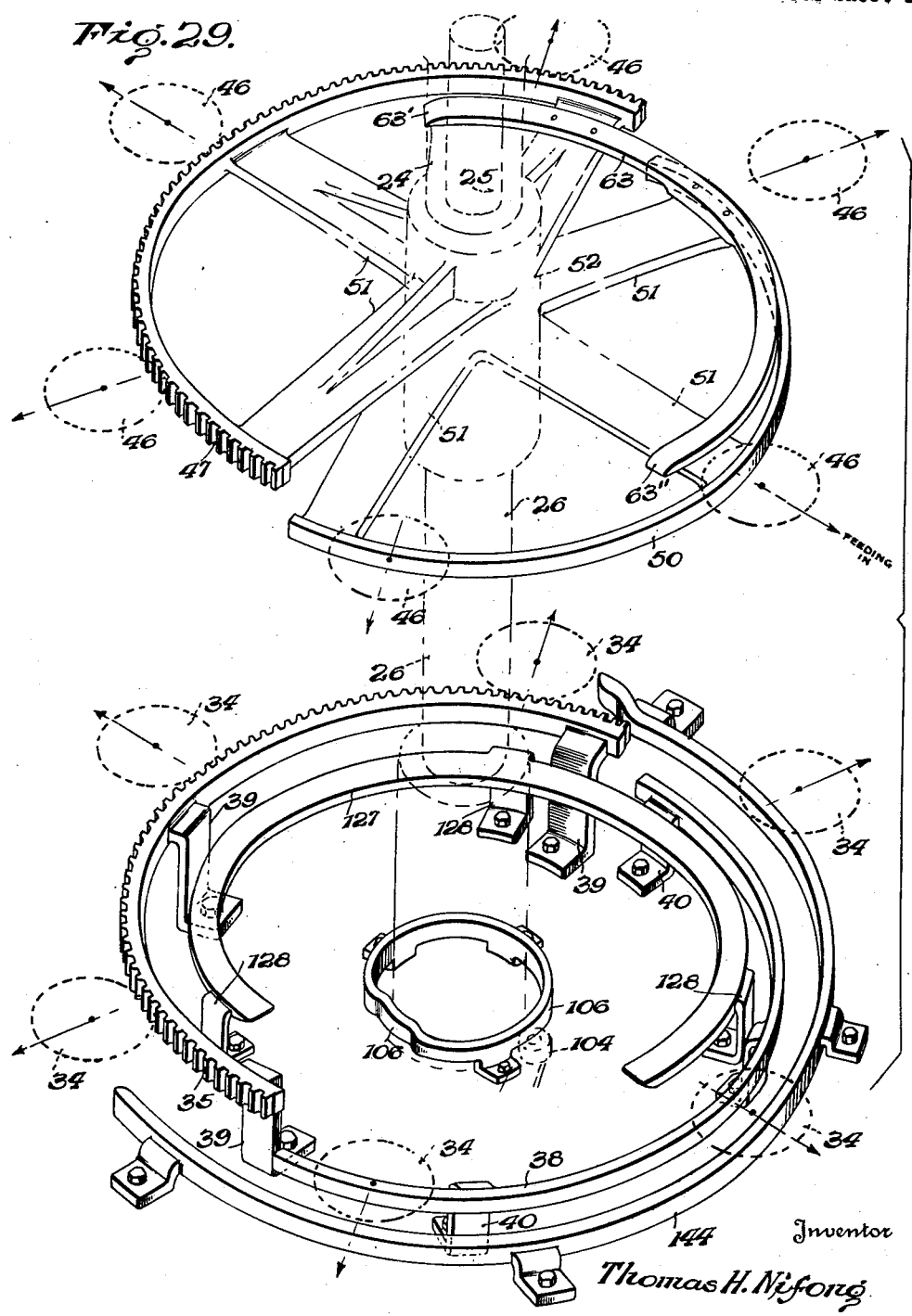

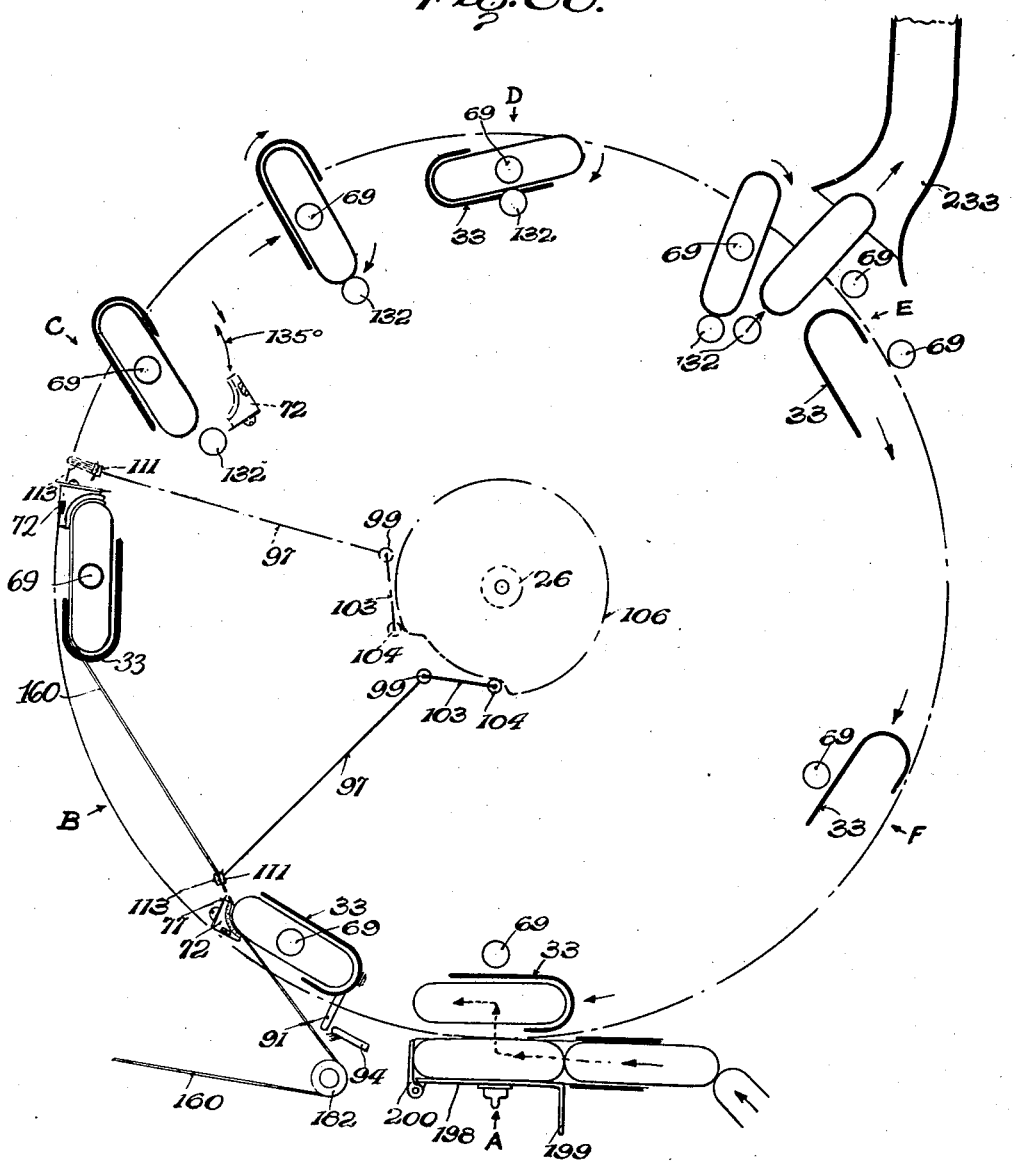

Patented June 14, 1938

2,120,505

UNITED STATES PATENT OFFICE 2,120,505

APPARATUS FOR APPLYING FLEXIBLE STRIPS TO RECEPTACLES

Thomas H. Nifong, Winston-Salem, N. C., assignor to Nifong Sealing Machine Company, Winston-Salem, N. C., a corporation of North Carolina Application December 6, 1935, Serial No. 53,275

36 Claims. (Cl. 216—29)

My invention relates to a method of and a machine for applying a strip, tape or the like to a can or other receptacle.

An important object of the invention is to provide a machine of the above mentioned character which will apply the strip or tape to the can and its cover or lid for effecting an air tight joint between the same.

A further object of the invention is to provide a machine of the above mentioned character wherein any suitable number of cans are caused to continuously travel and to have the strip or tape applied thereto during such travel.

A further object of the invention is to provide ironing means to properly press or iron the strip or tape to the can during the travel of the can.

A further object of the invention is to provide a machine of the above mentioned character which is automatic in operation and capable of rapid operation.

Other objects and advantages of the invention will be apparent during the course of the following description.

In the accompanying drawings forming a part of this application and in which like numerals are employed to designate like parts throughout the same, Figure 1 is a plan view of a machine embodying my invention, Figure 2 is a side elevation of the same, Figure 3 is an end elevation of the same, Figure 4 is a side elevation, upon an enlarged scale, of one operating unit, Figure 5 is a horizontal section taken on line 5—5 of Figure 4, Figure 6 is a horizontal section taken on line 6—6 of Figure 4, Figure 7 is a plan view of the gear and locking wheel, and associated elements, parts broken away, Figure 8 is a perspective view of a strip engaging device and supporting means for the same, Figure 9 is a side elevation of the same, Figure 9a is a side elevation of a tripping cam and resetting roller for operating the strip engaging device and cutter, Figure 9b is a plan view of the same, Figure 10 is a central vertical longitudinal section through the operating unit shown in Figure 4, Figure 11 is a plan view of the locking wheels, rack bar and track, of the strip engaging device, parts in section, and parts broken away, Figure 12 is an enlarged central vertical longitudinal section through the head of the pressure exerting device, Figure 13 is a perspective view of the driving means and associated elements of the machine, Figure 13a is a similar view of a slightly modified form of driving means, Figure 14 is a perspective view of the can injector and associated elements, Figure 15 is a central vertical section through the bearing supporting the lower end of the main vertical shaft, Figure 16 is a side elevation of the glue pot, parts in section, Figure 17 is a front elevation of the tape reel and supporting means, Figure 18 is a vertical section taken on line 18—18 of Figure 1, Figure 19 is a horizontal section taken on line 19—19 of Figure 18, Figure 20 is a perspective view of the can receiving pocket, ironing roller and associated elements, Figure 21 is a perspective view of the strip engaging head and can, Fig. 22 is a perspective view of a can with sealing strip as applied by means of the present invention, Figure 23 is a perspective view of the strip gripping device, showing the movable jaw closed, Figure 24 is a perspective view of the strip gripping device, showing the movable jaw open.

Figure 23a is a side elevation of a modified form of strip gripping device,

Figure 23b is a plan view of the device shown in Fig. 23a.

Figure 1:
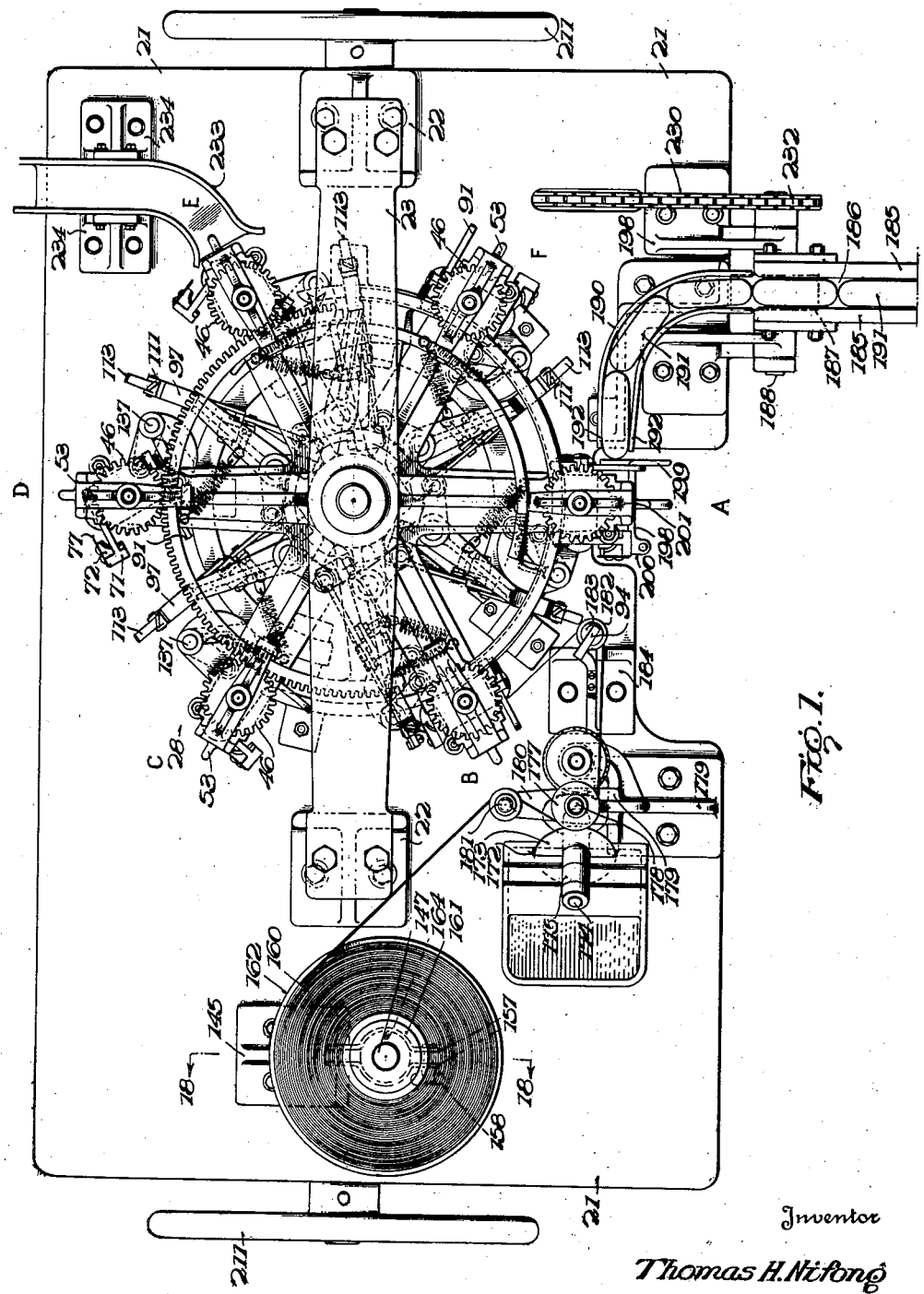

Figure 25 is a plan view of the strip gripping device, with the jaws in section, Figure 26 is a plan view of the discharge chute for receiving the completed cans, and associated elements, Figure 27 is a plan view of the feed trough and injector, and associated elements, with the injector in the outer position, Figure 28 is a similar view with the injector in the inner position, Figure 29 is a perspective view of the two sets of segmental racks and locking tracks, controlling the operation of the can receiving pockets and the strip engaging device and cutter, Figure 30 is a diagrammatic view illustrating the mode of operation of the machine.

In the drawings, wherein for the purpose of illustration is shown a preferred embodiment of my invention, the numeral 20 designates a frame having a table top 21. Rigidly attached to the top 21 and extending above the same are posts 22 rigidly connected by a horizontal transverse beam or bar 23, as shown. The beam 23 is provided with a bearing 24, receiving the reduced end 25 of a main vertical driving shaft 26, the lower end of which is journalled in a bearing 27, arranged beneath the table top 21.

The vertical shaft 26 carries a number of operating units 28, six being shown for the purpose of illustration, although this number may be varied, if desired.

Each operating unit embodies a radial arm 29, rigidly secured to the shaft 26, to rotate therewith. The radial arm 29 is provided at its outer end with a bearing 30, receiving a vertical shaft 31, equipped with an end thrust bearing 32. The shaft 31 is vertically arranged and is provided at its upper end with a can receiving pocket 33, rigidly secured thereto, Figure 23, to be more fully described. At its lower end, the vertical shaft 31 has a gear 34, rigidly secured thereto, and adapted to engage and disengage a stationary segmental rack 35. Beneath the gear 34 the shaft 31 is provided with a locking element or wheel 36, preferably formed integral with the gear 34. The locking element or wheel 36 is provided with a curved recess 37 to slidably engage with the outer face of a stationary track 38, as shown. The segmental rack 35 and track 38 are rigidly mounted upon the top 21 of the table by means of brackets 39 and 40, respectively. The segmental rack 35 and track 38 are oppositely arranged, and combined, extend throughout a complete circle. Particular attention is called to the fact that the segmental rack bar 35 extends for something slightly more than 180°, while the curved track 38 extends for something somewhat less than 180°. If desired, the relative lengths of the elements 35 and 38 may be varied, depending upon the number of times the can is to be turned when passing through the machine. At the adjacent ends of the track 38 and the segmental rack bar 35, is a space or gap, as clearly shown in Figure 7. In this Figure 7, the track 38 is shown as terminating adjacent to and slightly short of the center of the associated gear 34, while the first tooth of the segmental rack bar is spaced forwardly from the center of the gear for a substantial distance and engages with the gear. This arrangement is necessary in order to enable the gear and segmental rack bar to mesh properly and to also permit of the releasing of the locking element or wheel 36 by the locking track 38.

Each operating unit 28 further comprises a radial arm 41, which is rigidly attached to the vertical shaft 26. The arm 41 is provided with a bearing sleeve 42, rotatably receiving a sleeve 43, having a block 44 preferably formed integral with its lower end. The sleeve 43 is provided with an end thrust bearing 45 preventing its downward displacement. Rigidly attached to the upper end of the sleeve 43 is a gear 46, arranged to engage a stationary segmental rack bar 47. Preferably formed integral with the gear 46 and arranged beneath the same, is a locking element or wheel 48, having a curved recess or face 49, to engage a stationary curved track 50. The rack bar 47 and track 50 are carried by arms 51, which are attached to a boss 52, in turn rigidly attached to the bearing 24. The construction and arrangement of the gear 46, locking wheel 48, rack bar 47 and track 50 are identical with that of gear 34, locking element 36, rack bar 35 and track 38, respectively. The rack bar 47 is arranged directly over the rack bar 35 and coincides therewith, and the track 50 is arranged directly over the track 38 and coincides therewith, so that the action of these two rack bars and tracks will be in the same timed order. As a result of this, the can receiving pocket 33 and the block 44 travel and turn in unison.

Each operating unit further comprises a pressure device to engage the top of the can. This pressure device includes a bracket 53 rigidly attached to the bearing sleeve 42 and extending vertically above the same and provided with a guide sleeve or bearing 54, as shown. Slidably mounted within the guide sleeve 54 and within the sleeve 43 is a tube 55, having a collar 56 clamped to the upper end thereof, and this collar carries a depending key 57, preferably integral therewith, operating within a longitudinal groove 58 formed in the guide sleeve or bearing 54. By virtue of the collar 56 and associated elements, the tube 55 may move longitudinally but cannot turn upon its longitudinal axis. Rigidly attached to the tube 55, at a point beneath and spaced from the sleeve or bearing 54, is a sleeve 59, carrying an arm 60, rigidly secured thereto. The tube 55 is forced downwardly by a compressible coil spring 61, engaging between the sleeves 54 and 59, as shown. A roller 62 is attached to the inner end of the arm 60, and is arranged to engage an elevating cam 63, Figure 1. Rotatably mounted within this tube 55 is a rod 64 which is free to turn upon its longitudinal axis within the tube 55, but cannot move longitudinally with relation to the tube. At its upper end, the rod 64 has a collar 65 clamped thereon. The tube 55 extends downwardly below the block 44, and this tube 55 is provided at its lower end with a flange 66, disposed opposite a flange 67, formed upon the lower end of the rotatable rod 64. An end thrust ball bearing 68 is arranged between the elements 66 and 67. A rubber cap 69 is secured to the flange 67, to engage with the top of the can and is held upon the flange 67 by a screw 70 or the like, having its head countersunk. It is thus seen that the rod 64 is at all times free to turn upon its longitudinal axis when the can is turned upon its axis and the tube 55 is free to move longitudinally, but cannot turn upon its longitudinal axis with respect to the sleeve or bearing 54, whereby arm 60 is maintained in its proper radial position.

Each operating unit comprises a strip or tape engaging and pressing device and tape cutting device, including an arm 71, provided at its free end with a head 72, having a recess 73. This recess receives a liner 74, preferably formed of rubber or other compressible or resilient material, and this liner has a recess 75, corresponding to the shape of the particular can to be handled, and also a groove 76 to receive the usual rib present at the junction of the lid and body of a can, such as a tobacco can. A sharp cutter or blade 77 is attached to the outer wall of the head 72 by screws 78 or the like, and projects outwardly beyond the head. This blade is preferably tapered or pointed, as shown. The purpose of this blade is to cut the strip at the right time, as will be more fully explained. The arm 71 has its inner end rigidly attached to a rock shaft 79, mounted within an opening 80, formed in the head 44, Figures 8, 9 and 10. At its opposite end, the rock shaft 79 has a keeper 81, rigidly secured thereto by means of a transverse pin 82 or the like, and a tortional coil spring 83 is mounted upon the free end of the rock shaft 79 and has one end engaging a stud 84, carried by a finger 85, integral with the keeper and projecting radially therebeyond. The opposite end of the spring 83 engages a stud 86, mounted upon the block 44. The function of the spring is to turn the keeper 81 and its rock shaft 79 in a direction to swing the arm 71 inwardly and downwardly when the keeper is released. The keeper 81 has a notch providing a shoulder 87, to be engaged by the head 88 of a dog 89. This dog is pivotally mounted at 90 upon block 44 and has a tail 91 extending outwardly beyond the block. A pull coil spring 92 is attached to the dog at 93 and to the block 44, at the stud 86. This spring serves to move the head 88 of the dog toward the keeper. Operating in conjunction with the tail 91 of the dog of each operating unit, as it is brought to the proper selected position, is a stationary trip cam 94, which serves to raise the tail which depresses the head 88 of the dog and releases the keeper 81, whereby the arm 71 will automatically swing downwardly and inwardly to bring the head 72 in contact with the can and also cause the blade 77 to cut the strip of cellophane or the like. The keeper 81 of each successive operating unit is reset by a roller 95 carried by a stationary lug or support 96, in turn mounted upon the bearing 42. This roller 95 engages in front of the finger 85, turning the keeper in a direction to return the shoulder 87 behind the head 88. Instead of mounting a roller 95 upon each bearing or sleeve 42, for resetting the keeper 81, as the keeper turns with the block 44 about the bearing 42, I contemplate using one roller to engage the several keepers 81 in succession, such roller being pivotally supported at a suitable point for this purpose. When a single roller is employed to reset the several keepers 81, such a roller, Figure 9a, designated 95', is mounted upon a bracket 96', rigidly secured to the up-right 22. The roller 95 resets the keeper while the tail 91 of the latch would then be tripped by a cam or trip element 97', carried by a bracket 98' also secured to the upright 22. Roller 95' is arranged at an elevation above the cam 97'. When this construction is employed, bracket 53, Figure 10, extends circumferentially instead of radially.

Each operating unit further comprises a gripping device to engage and disengage the strip of cellophane. This gripping device comprises a horizontally swinging arm 97, which is rigidly secured to a sleeve 98, in turn rigidly mounted upon a vertical rock shaft 99, and this rock shaft is journalled in a vertical bearing 100, rigidly secured to the arm 29, at a point radially outwardly of the main vertical shaft 26. An end thrust bearing 101 is preferably arranged beneath the lower end of the sleeve 98. A sleeve 102 is rigidly clamped to the lower end of the vertical rock shaft 99 and this sleeve is provided at its lower end with a radially projecting crank 103, carrying a horizontal roller 104, pivotally mounted thereon at 105. This roller engages a stationary cam 106. The arm 97 is swung in one direction to bring the roller 104 in engagement with the cam 106 by means of a pull coil spring 107, one end of which is attached to a stationary pin 108 mounted upon the arm 29, and the opposite end of the spring is attached to a stud 109, mounted upon a web 110, integral with the arm 97. The function of the roller 104 and cam 106 is to limit or regulate the swinging movement of the arm 97, as will be more fully explained. The gripping device comprises a gripping element including a stationary jaw 111, which is substantially vertically arranged and carried by a bar 112, rigidly mounted upon the arm 97. Arranged opposite the stationary jaw 111 is a movable jaw 113, pivotally connected with the bar 112, at 114, and a crank 115 is rigidly secured to the jaw 113 and moves the same to opened and closed positions. A link 116, is pivotally connected with the crank 115, as shown at 117, and this link is generally horizontally arranged and is pivotally connected at 118 with the upper end of a vertically swinging crank 119. This crank 119 is pivoted upon the web 110, as shown at 120. Rigidly connected with the crank 119 to move therewith, is a crank 121, having its free end pivotally connected with a vertical link 122, as shown at 123. The vertical link 122 extends downwardly for pivotal connection at 124 with a vertically swinging arm 125, having a roller 126 pivotally mounted upon its free end. This roller is adapted to engage beneath a stationary cam 127, to depress the same. The cam 127 is secured to a bracket 128, in turn mounted upon the top 21 of the table. The opposite end of the arm 125 is pivoted upon a bolt or pivot 129, carried by an apertured ear 130, formed integral with the sleeve 102. The arm 125 is swung upwardly by a pull coil spring 131, attached thereto at 124. The upper end of the spring 131 is attached to the stud 109. From the foregoing description, it will be seen that the spring serves to close the movable jaw 113, while the cam 127 depresses the roller 126 to open the movable jaw.

In Figures 23a and 23b, I have shown a modified form of the means to operate the gripping device. This means comprises a tube 106', journalled in the bearing 100, carried by the arm 29. The sleeve 102 is clamped to the lower end of the tube 106' and this sleeve carries the crank 103, carrying the roller 104, operating in connection with the cam 106. The arm 97 is rigidly secured to the sleeve 98, and this sleeve 98 is clamped to the tube 106'. The stationary jaw 111 is carried by the arm 97 and the same pivoted jaw 113 is provided, which is moved to the closed position by the link 116. This link is pivotally connected at 107' with the long arm of an inverted bell crank lever 108' pivoted at 109', upon a bracket 110', carried by the arm 97. The short horizontal arm 111' of the bell crank lever has a suitable pivotal connection with a head 112' clamped to a rod 113', mounted to slide within the tube 106'. The head and rod are drawn downwardly by a spring 114', and the rod is provided at its lower end with a vertical roller 115' to engage a cam 116', which is used instead of the cam 127. When the roller 115' engages the lower portion of the cam 116', the movable jaw 113 closes and this jaw opens when the roller 115' travels upon the raised portion of the cam 116'. Rod 113' cannot turn within tube 106', as this rod is provided with a transverse key 117', operating within elongated slots 118' formed in sleeve 98 and tube 106'. The device shown in Figure 23a has substantially the same mode of operation as the device shown in Figure 23, but is simpler.

Each unit 28 includes a rolling or ironing device to act upon the strip of cellophane after it has been applied to the can for effecting a tight joint. This ironing mechanism comprises a vertical roller 132, preferably covered with rubber. This roller is rotatable upon a vertical stud 133, which is fixed within a sleeve 134, rigidly mounted upon a horizontally swinging arm 135, preferably longitudinally curved, as shown. The arm 135 is rigidly mounted upon a sleeve 136, clamped to a vertical rock shaft 137, and this vertical rock shaft is journalled in a bearing 138, rigidly mounted upon the arm 29. An end thrust ball bearing 139 is preferably arranged beneath the sleeve 136. A crank 140 is rigidly secured to the sleeve 136 and is moved in one direction by a pull coil spring 141, rigidly attached to the pin 108. The spring 141 moves the roller 132 into engagement with the can. At its lower end a crank 142 is rigidly secured to the rock shaft 137 and carries a roller 143 arranged to engage a stationary track or cam 144. This track or cam 144 is rigidly mounted upon the table top 21, as shown. The function of the track or cam 144 and roller 143 is to retain the roller 132 out of engagement with the can during a portion of the cycle of operation, as will be more fully explained.

Means are provided for supporting a roll of the strip of cellophane so that the same may be fed, and for regulating the tension of the same during the feeding operation. This means comprises a bracket 145 rigidly mounted upon the table top 21. This bracket carries a pair of clamping jaws 146, adapted to receive a vertical spindle 147 and the jaws are brought together by means of a bolt 148 or the like, for clamping engagement with the spindle to hold the same stationary. Rotatably mounted upon this vertical stationary spindle 147 is a vertical sleeve 149, embodying a spool or drum portion 150, arranged between preferably resilient friction strips or arms 151. These friction strips or arms are preferably lined with fibrous material, as indicated at 152, which may be leather or the like. The rear ends of the strips or arms 151 are disposed upon opposite sides of an extension 153 of the bracket 145 and are rigidly attached thereto by a bolt 156 or the like. The opposite or free ends of the strips 151 are adjustably connected by means of a bolt 157 carrying a winged nut 158, and a spring 159, preferably arranged between the ends of the strips 151. It is obvious that by manipulating the nut 158, the strips 151 may be drawn together and an increasing amount of friction applied to the spool or drum portion 150, for regulating its turning movement. The roll 160 of the cellophane is adapted to be placed upon a spool 161, to turn with the spool, and the spool embodies a supporting plate 162. The spool 161 has an opening or recess 163 to receive a pin 164, also fitting in an opening 165, formed in the sleeve 149. It is thus seen that the roll of cellophane will turn as a unit with the sleeve 149.

Figure 2:
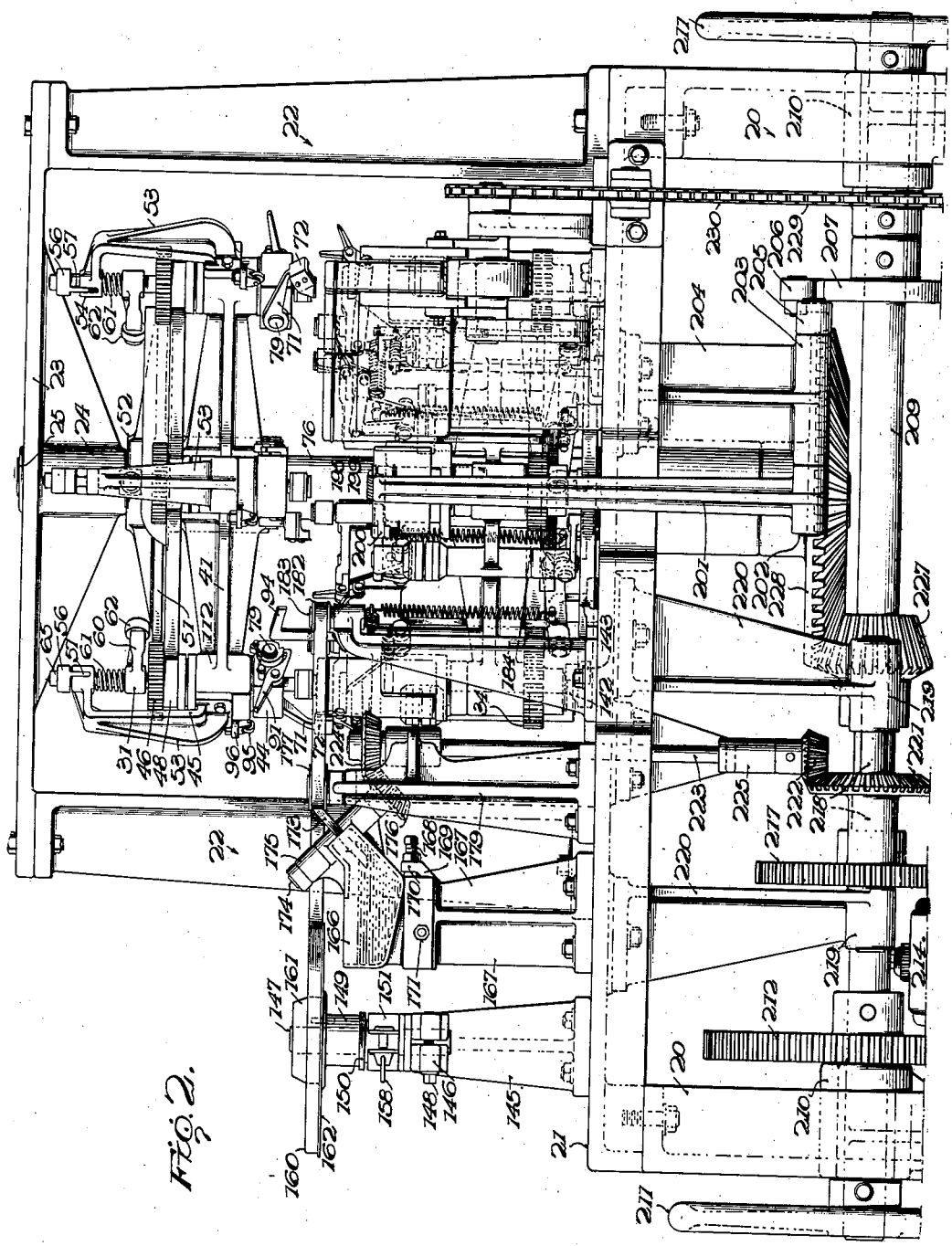

Means are provided to apply an adhesive to that side of the cellophane strip which is brought into contact with the can, such means comprising a glue pot 166, mounted upon a pedestal 167, rigidly mounted upon the table top 21. The glue pot 166 is preferably horizontally adjustable upon the pedestal 167, and is slidably mounted thereon, and is adapted to be brought into engagement with an adjusting screw 168, carried by a bracket 169, rigidly secured to the pedestal 167. This screw has screw-threaded engagement with the bracket 169 and is equipped with a lock nut 170, and a set screw 171 is employed to lock the glue pot in the adjusted position. The glue pot has a slot 172 in its upper portion through which operates a rotatable glue applying wheel or element 173, and this glue applying wheel is rigidly mounted upon an inclined shaft 174, journalled in stationary bearings 175, and provided at its lower end with a bevelled gear 176, rigidly secured thereto. The glue applying element or wheel 173 is arranged opposite a flanged flat face pulley 177, pivotally mounted upon a stud 178, carried by a pedestal 179, rigidly mounted upon the table top 21. A laterally projecting arm 180, Figures 1 and 2, is secured to the pedestal 179, and has a guide roller 181 rotatably mounted thereon. The strip of cellophane from the roll 160 passes about the guide roller 181 and then between the glue applying wheel 173 and roller 177 and then about another guide roller 182, mounted upon a vertical stud 183, carried by a vertical pedestal or bracket 184, attached to the table top 21. The strip of cellophane, after passing about the guide roller 182, is brought in contact with each successive can, during the operation of the machine, as will be explained.

The can feeding means comprises a horizontal trough 185, in the bottom of which is arranged the upper run of a continuously travelling endless belt 186. This belt advances the cans and may slip upon the cans, between the can feeding actions. This belt passes over a pulley 187, mounted upon a shaft 188, carried by brackets 189, which also serve to support the outlet end of the trough. The opposite end of the endless belt passes about a pulley (not shown). The numeral 190 designates a trough extension receiving the cans 191 from the trough 185. At its forward or outlet end, the sides 192 of the trough extension are cut away, Figures 27 and 28 and 14, while the bottom 193 projects beyond these sides, and serves to support a can fed upon such bottom.

Each pocket includes a bottom 194, Figures 20, 27 and 28, and the side 195 is cut away at the leading point 196 to the trailing point 197, whereby the leading end of the pocket is opened, its trailing end closed, its inner side closed, and its outer side opened throughout the major portion of its length. As each pocket is brought to the loading position, adjacent to the bottom 193, the can upon this bottom 193 is shifted laterally into such pocket, by a movable injector 198, provided at its trailing end with a slicing or covering extension 199, and at its leading end with a spring pressed pivoted gate 200, secured thereto, as shown. The gate 200 is normally held in the closed position by a spring 200', but will yield and open to permit of the travel of the can with the pocket, during the transfer operation, and will serve to shift the can rearwardly with relation to the pocket so that the can will engage the closed trailing end of the pocket. The injector 198 is rigidly mounted upon the upper end of a long vertically swinging arm 201, extending downwardly and rigidly mounted upon a horizontal rock shaft 202, Figures 2, 3, and 13, journalled in a bearing 203, carried by a bracket 204, attached to the table top 21. A crank 205 is rigidly mounted upon the rock shaft 202 and has a roller 206 mounted upon its free end and this roller is arranged to engage a rotary cam 207 having depressions 208 in its periphery. A spring 201' serves to move arm 201 inwardly.

Figure 3:
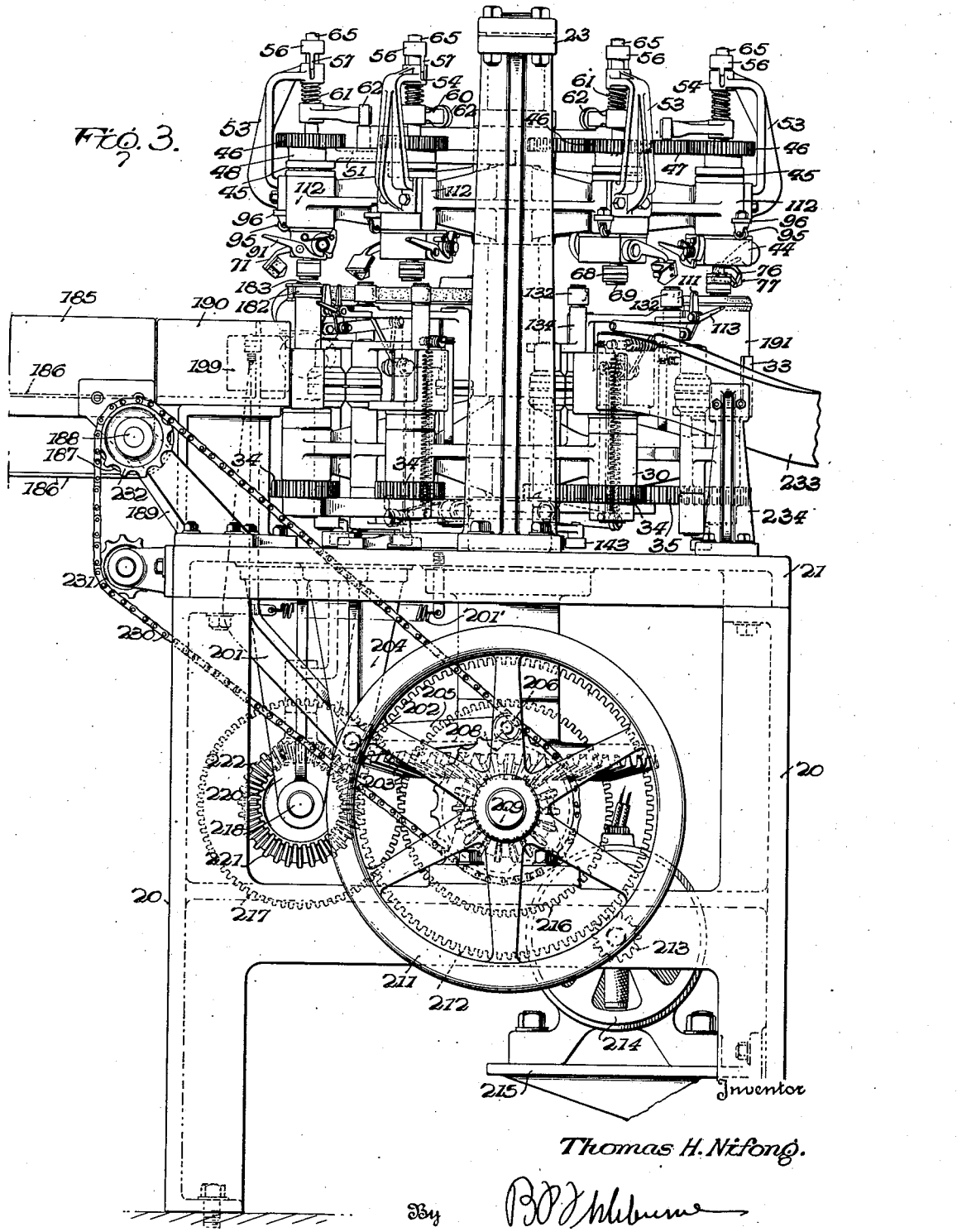
Figure 4:
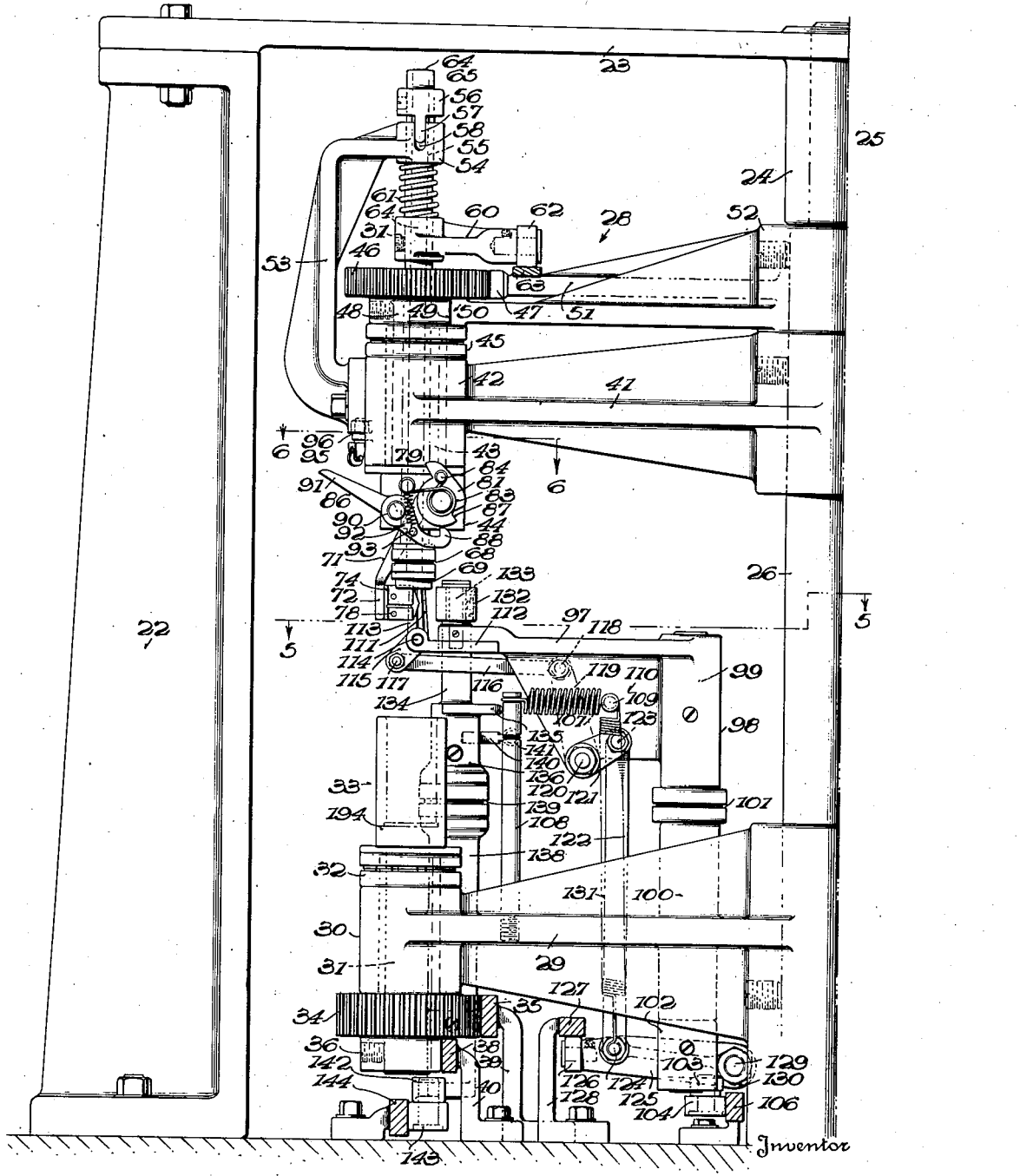

The numeral 209 designates a main horizontal drive shaft, Figures 2, 3 and 13, journalled in bearings 210, and preferably equipped at its ends with hand wheels 211 so that the machine may be manually turned over, if desired. The shaft 209 is driven by a gear 212, rigidly mounted thereon, driven by a small gear 213, in turn driven by a motor 214, rigidly mounted upon a bracket 215. This bracket is secured to the frame 20. A gear 216 is rigidly mounted upon the shaft 209, and engages a gear 217, mounted upon a jack shaft 218, journalled in bearings 219, carried by brackets 220, arranged beneath and attached to the table top 21. This jack shaft has a bevelled gear 221 rigidly secured thereto, engaging a horizontal bevelled gear 222, rigidly secured to the lower end of a vertical shaft 223, having a horizontal bevelled gear 224 rigidly secured to its upper end, and engaging the bevelled gearing 176. The vertical shaft 223 is journalled in bearings 225 and 226, carried by pedestal 179. A bevelled gear 227 is rigidly mounted upon the horizontal drive shaft 209 and engages a horizontal bevelled gear 228, rigidly secured to the lower end of the vertical shaft 26. The cam 207 is rigidly mounted upon the shaft 209. A sprocket wheel 229 is also rigidly mounted upon the shaft 209 and drives a sprocket chain 230, passing over a guide sprocket wheel 231 and engaging a sprocket wheel 232 rigidly mounted upon the shaft 188, as shown in Figure 3. The numeral 233 designates a chute to receive the cans as they are discharged from the machine, mounted upon brackets 234, fixed to the top 21 of the table.

In Figure 13a, I have shown a modified form of the drive or gear for the machine so that the can feeding belt 186 may be driven while the remainder of the machine is at rest. The object of this is to fill the trough with cans before starting the machine, but the trough may be filled manually, if desired. In order to effect a separate drive for the endless belt 186, I mount the gear 212 loosely upon the main drive shaft 209, and provide a clutch device 209', to lock and unlock the gear 212 to and with the shaft 209. Rotating with the gear 212 is a sprocket wheel 210' driving sprocket chain 211', engaging a sprocket wheel 212', mounted upon a countershaft 213'. The sprocket wheel 229 shown in Figure 13 as mounted upon the shaft 209, is mounted upon the countershaft 213', and the sprocket chain 230 will engage this sprocket wheel 229. It is thus seen that as soon as the motor drives the gear 212, the endless belt 186 will be driven and the machine proper will be set into action when clutch 209' locks gear 212 to the main drive shaft 209.

The operation of the machine is as follows:
As each operating unit approaches the can receiving position, designated at A, Figure 27, when the leading end of the pocket 33 assumes the position indicated in Figure 27, the injector 198 is starting, or about to start, upon its inward travel, since the roller 206 has now reached the intake end of the depression 208 of the cam 207. As the pocket 33 continues to travel forwardly toward the position shown at A, Figure 28, the injector 198 is continuing its inward movement, and is shifting the can into the pocket 33 through its open side. While the can is being transferred into the pocket 33, the hinged spring pressed gate 200 aids in such transfer, and the gate holds the can against travelling movement with and in the direction of travel of the pocket, whereby the can is brought well into the closed rear end of the pocket, and as this occurs, the gate will open to permit of the proper travel of the can with the pocket, and during this operation the injector is returning to its normal or outer position. Upon the inward movement of the injector 198, the guard 199 covers the next can, preventing the same passing upon the bottom 193, behind the injector. When the injector moves outwardly to the opened position, the next can is again advanced upon the bottom 193, in advance of the injector and engages the gate 200. This can is therefore in position to be inserted into the next approaching pocket. When the pocket reaches the position A, as explained, the roller 62 is still travelling upon the track 63, and this track extends from a point 63', position E, to a point 63", slightly beyond position A. The pressure head 69 is therefore retained elevated and will not interfere with the passage of the can into the pocket. Further, the ironing roller 132 is also held in the inner position out of contact with the can, as the roller 143 is engaging the track 144. Also, as the pocket reaches position A, the gripping device is in the intermediate position at H, between positions A and B, since roller 104 is now engaging the raised portion of cam 106. Further, the pocket 33 is held against rotation upon its axis as the locking wheel 36, is still engaging the track 38. Also, when the pocket 33 is in position A, the head 72 is in the raised or outer position and the movable jaw 113 of the gripping device is in the open position, Figure 24. With the several elements in these positions, the pocket now travels from position A toward position B. The roller 62 will shortly pass off of the track 63 and the rubber cap 69 will engage the top or lid of the can and force it firmly into the closed position and also firmly hold the can in the pocket. At about the time that the roller 62 passes from the track 63 and pressure is applied to the top of the can, as explained, the roller 104 will engage the low portion 106' of the cam 106, and the arm 97, carrying the gripping device will swing counter-clockwise or in an opposite direction to the travel of the unit, whereby the gripping device will assume a position near the pocket and also a position which will enable the same to grip the cellophane strip at the proper position. At about the time that the pocket assumes a position substantially intermediate between positions A and B, the side of the can will engage with the tape, and as soon as this is accomplished, the roller 126 will travel from beneath the track 127, and the spring 131 will raise the arm 125, and the associated elements will instantly close the movable jaw 113. The strip will be then clamped within the gripping device. As soon as the gripping device is closed, the tail 91 passes over the cam 94 and is raised, whereby the head 88 of the dog is moved downwardly and the keeper 81 released, whereby the spring 83 swings the arm 71 and head 72 to the inner or lower position, and the blade 77 will cut the cellophane strip. As the pocket travelling further from position A toward position B, passes position B, the locking wheel 36 disengages track 38 at about the time that gear 34 engages segmental rack bar 35. As soon as gear 34 engages rack bar 35, the pocket is turned upon its vertical axis while travelling from past position B toward position C and toward the remaining positions D and E. When this same pocket has reached position B and is passing clockwise from it, the next travelling pocket has reached position A and is travelling toward position B and all of the operations described at position A have occurred, and the gripping device of the unit at position A has gripped the tape and the tape has been cut. Now when the can past position B starts to turn on its vertical axis, the tape extends from this can to the gripping device of the unit near position A, and the turning movement of the can near position B will wind the tape on this can and will draw the gripping device of the unit near position A toward the can near position B. When the can formerly near position B has travelled past position C, the tape will have been completely wrapped around the same with its ends slightly overlapped and at this point, the gripping device releases the tape, by roller 126 again passing beneath track 127. At about, or slightly before, the time the can reaches position C, extension 85 passes beneath roller 95, and the cutting device is reset by arm 71 swinging outwardly, and the head 88 of the dog engaging behind shoulder 87. Immediately after the resetting of the cutting device, as explained, the ironing roller 132 is brought into engagement with the applied tape, since roller 143 will pass off of track 144, and spring 141 will cause the ironing roller 132 to have proper engagement with the tape, to place the tape under compression to firmly press the same against the can and lid. The can now travels from position C to position D, and while travelling between these positions, it is rotating and the ironing action continues by the action of the roller 132. The can now travels from position D to position E and is rotated and ironed during this travel and when position E is reached, the can will assume an edgewise position with respect to the outlet chute 233 and at about this time the pressure is released from the top of the can by the roller 62 riding upon the cam 63. The action of the spring 141 forcing the roller 132 against the can will now push the can from its pocket into the chute 233. It should be noted that the pocket now travels from position E toward position F, and the pocket continues to rotate until it extends circumferentially instead of laterally, with its open side out, at which time the gear 34 disengages rack bar 35 and locking element 36 engages track 38, and the pocket is again held against turning movement upon its vertical axis. The pocket will again travel from position F to position A without turning upon its vertical axis so that it will be capable of receiving the next can. The cycle of operation is then repeated.

The complete cycle of operation of the machine will now be given in connection with Figure 30. In Figure 30 the several positions are indicated as A, B, C, D, E, and F. The arrows travelling circumferentially indicate that the cans are travelling and being held against turning movement upon their axes, while the curved rotating arrows indicate that the can is turning upon its axis, while continuing its circumferential travel.

The can receiving pocket is held against turning movement when it reaches "A" position, and its open end is leading and its open side is outermost. The can pressing element 69 is now raised and out of engagement with the can. At about the time that the can reaches the can receiving position "A" the injector 198 forces the leading can laterally into the pocket.

The can pressing element or clamp 69 is set into action shortly after the can passes position "A" and engages the top of the can, while the pocket 33 is travelling circumferentially but is held against turning movement upon its axis. The can now travels to a position about one-half way between positions "A" and "B" and there contacts with the flexible strip 160, having the adhesive applied to its surface next to the can. The strip 160 is at this time engaging the leading can at the one-half position between "B" and "C" and also the next trailing can at the one-half position between "A" and "B". The engagement of the strip with the can at the one-half position between "B" and "C" and with the guide roller 182, serves to support the strip so that the outer side of the can may contact with the strip when the can reaches the strip contacting position. The gripper including the movable jaw 113 of the unit travelling toward position "B" now engages and holds the tape at a point next to the can at a position one-half way between "A" and "B". Shortly after the closing action of the gripping device upon the strip or tape, the arm 91 is tripped by the cam 94 and the strip pressing head 72 and cutter move downwardly to firmly press the strip to the can, at a position substantially one-half way between position "A" and position "B" and to also cut the strip at a point rearwardly of the then closed gripper and the adjacent strip engaging head 72.

Figure 5:
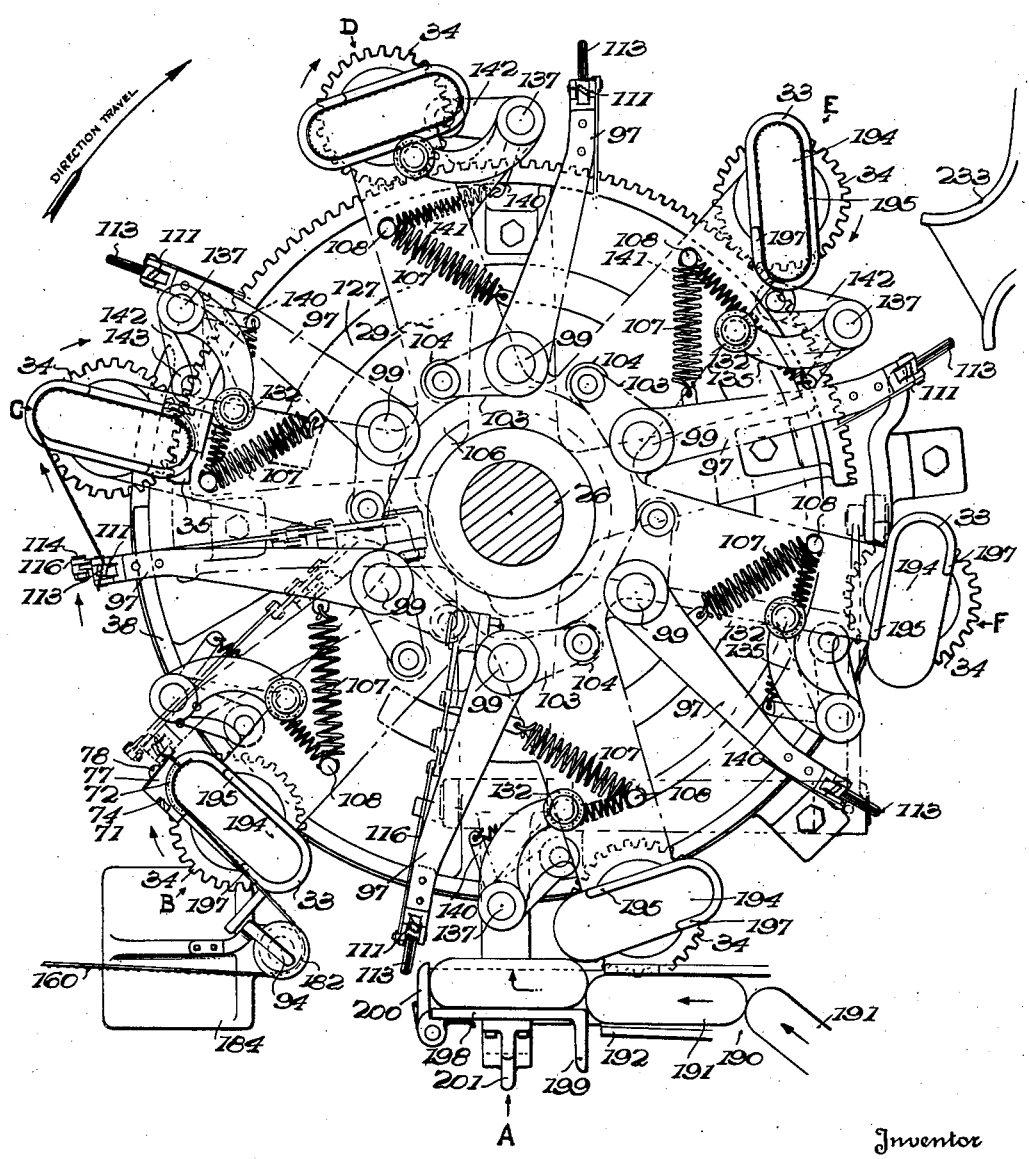

The clamping head 72 continues to press the strip 160 to the can while the can reaches position "B" and continues to so function when the can reaches a position about one-half way between position "B" and position "C" and shortly after passing this intermediate position, the can holding pocket is released and its turning movement upon its axis is started, while it continues to travel circumferentially. This turning movement of the can upon its axis winds the cut tape, held at one end by the head 72 upon the can and at the other end by the gripping jaw 113, upon the can, and swings the gripper toward the can, approaching position "C". The grippers and the can receiving pockets are bodily mounted on the same rotatable moving support, and therefore are continuously moving together, but each gripper is swung with relation to the moving support and toward its next leading pocket by the turning movement of the pocket upon its axis with relation to the rotatable support, when the strip or tape is wound upon the receptacle. The cam 106 is in the nature of a stop to limit the relative rearward movement of the gripper with respect to the rotatable support. This cam is of course stationary while the gripper arms 97 rotate about it. The raised portion of the cam coacts with the retractile coil spring 107 to hold the gripper arms in the intermediate position during the major portion of their rotation around the cam, as clearly shown in Figure 5, but when the gripper reaches the gripping position, the roller 104 engages the depressed portion of the cam thus permitting the gripper to be moved rearwardly by the retractile coil spring and thereby brought into the proper position, adjacent to the next trailing can to grip the strip or tape, as clearly shown in Figures 5 and 30. Head 72 turns with can approaching position "C", and this turning movement of the head is for about 135°, when head 72 moves from can and releases the strip 160, as keeper 81 is reset by engaging roller 95. The can and block 44 carrying the raised head 72 continue to turn to first complete the winding of the strip upon the can. When the can completes slightly more than one-half of a revolution, the tape is completely wound around the can and the gripper jaw 113 opens to release the tape. By the time the can completes this one-half revolution, it has reached and slightly passed the position "C".

The ironing roller 132 is held from action upon the applied strip up to this point of movement of the can and shortly after the movement of the can beyond position "C" to position "D" the ironing roller is thrown toward the can for ironing action with the strip, while the can is being turned upon its axis. The can turns a complete revolution while travelling from position "C" to position "D".

The can now travels from position "D" to position "E" with the spring pressed ironing roller engaging the can and the can turns for about three-fourths of a revolution so that the can is generally radial when it reaches chute 233 at "E". The can clamp 69 has remained in engagement with the top of the can up to about this point and is released just before or as the can assumes the radial position at "E" in alignment with the chute 233, and the spring pressed ironing roller 132 will then slide the can into the chute 233.

The can receiving pocket 33 travels from position "E" to position "F" and turns for about one-fourth of a revolution so that it will be circumferential with its open end leading and its open side outermost, and after this adjustment is effected, the can receiving pocket 33 is again held against turning movement upon its axis and can reaches position "F". The can continues to travel circumferentially while being held against turning movement upon its axis, until it reaches position "A", where the cycle of operation is repeated.

It is to be understood that the form of my invention herewith shown and described is to be taken as a preferred embodiment of the same, and that various changes in the shape, size, and arrangement of parts may be resorted to, without departing from the spirit of my invention or the scope of the subjoined claims.

Having thus described my invention, I claim:

1. In a machine for applying a strip or tape to a receptacle, means to continuously advance the receptacle, means for bringing the strip into contact with the receptacle during the advancing movement, and means to cause the strip to be wound upon the receptacle during the advancing movement including an element to press the strip to the receptacle, and a yielding gripping element to engage the strip at a point remote from the receptacle.

2. In a machine for applying a strip or tape to receptacles, a moving support, means to continuously drive the moving support, a plurality of receptacle receiving and holding devices mounted upon the support to move therewith, means for supporting a strip in the path of travel of each receptacle as it is moved to a selected position, means to cut the strip, a yielding gripping device to engage the strip, and means to turn each device upon its axis to wind the strip engaging the receptacle upon such receptacle.

3. In a machine for applying a strip or tape to receptacles, a moving support, a plurality of receptacle receiving and holding devices mounted upon the support to move therewith, means for supporting the strip in the path of travel of each receptacle as it is moved to a selected position, a device to grip the strip in advance of each receptacle, a device to engage the strip after the action of the strip gripping device and hold the strip upon the receptacle and also cut the strip, and means for turning each receptacle receiving and holding device upon its axis to wind the strip thereon.

4. In a machine for applying a flexible strip or tape to a receptacle, means to engage the strip and hold the same upon the receptacle, means to engage the strip for holding the same and movable toward the receptacle when the receptacle is turned upon its axis, and means to turn the receptacle upon its axis.

5. In a machine for applying a flexible strip or tape to a receptacle, means engaging the receptacle and turning the same upon its axis, means to engage the strip for holding the strip in engagement with the receptacle and travelling with the receptacle during a portion of its turning movement, releasable means engaging the strip at a point remote from the receptacle and travelling toward the receptacle as the receptacle is turned upon its axis and the strip wound thereon, and means to cut the strip at a point rearwardly of the releasable strip engaging means and after the releasable strip engaging means has holding engagement with the strip.

6. In a machine for applying a flexible strip or tape to a receptacle, a moving support, a plurality of spaced receptacle holding devices mounted upon the moving support to move therewith and to turn upon their axes with relation thereto, means to turn each receptacle holding device upon its axis, strip guiding means, means arranged near each receptacle holding device for engaging the strip and holding the same upon the receptacle during a portion of the turning movement of the same upon its axis, the strip holding means and the strip guiding means supporting the strip so that each successive receptacle will be brought into contact therewith, a device for coaction with each receptacle for releasable holding engagement with the strip and movable with the strip toward the receptacle as the strip is wound upon the receptacle, and means to cut the strip at a point rearwardly of the releasable holding means.

7. In a machine for applying a flexible strip or tape to a receptacle, a moving support, a plurality of spaced receptacle holding devices mounted upon the moving support to move therewith and to turn upon their axes with relation thereto, means to turn each receptacle holding device upon its axis, strip guiding means, means arranged near each receptacle holding device for engaging the strip and holding the same upon the receptacle, means to cause each strip holding means to travel with the receptacle holding device during a portion of its turning movement, the strip holding means of the leading receptacle holding device and the strip guiding means supporting the strip so that the next trailing receptacle will be brought into contact with the strip, a strip holding mechanism for coaction with each receptacle holding device, means to cause the mechanism to have holding engagement with the strip at a point remote from the receptacle and to release the strip as the mechanism approaches the receptacle upon the winding of the strip upon the receptacle, and means to cut the strip at a point rearwardly of the strip holding mechanism.

8. In a machine for applying a flexible strip or tape to a receptacle, a receptacle holding device, a supporting member, means to turn the receptacle and supporting member in unison about a common axis, a movable strip engaging member mounted upon the supporting member to engage with the strip and hold the strip in engagement with the receptacle during a portion of the turning movement of the receptacle, and a strip cutter carried by the movable strip engaging member.

9. In a machine for applying a flexible strip or tape to a receptacle, a device to engage the strip and press the same upon the receptacle, and a blade carried by the device to cut the strip when the device presses the strip upon the receptacle, and means to turn the receptacle and device about a common axis.

10. In a machine for applying a flexible strip or tape to a receptacle, a head for engaging the strip and pressing the same into engagement with the receptacle, means to move the head toward the receptacle, means to turn the receptacle and head about a common axis, and a blade mounted upon the head to cut the strip when the head moves toward the receptacle.

11. In a machine for applying a flexible strip or tape to a receptacle, a turning supporting member, a spring actuated arm pivoted upon the supporting member, a head carried by the arm to engage the strip and hold the same upon the receptacle, a latch device to hold the pivoted arm against movement, means to trip the latch device, means to reset the pivoted arm, and means for holding a can in cooperative relation to the turning supporting member and means for turning the supporting member and can holding means upon their axes.

12. In a machine for applying a flexible strip or tape to a receptacle, a block, a rock shaft pivoted upon the block, an arm connected with the rock shaft and carrying a head to engage the strip and force the same into engagement with the receptacle, a keeper secured to the rock shaft and having a resetting extension, a spring to turn the rock shaft in one direction, a dog to engage the keeper and having a tail, means to trip the tail, and means to engage the resetting extension of the keeper to reset the rock shaft.

13. In a machine for applying a flexible strip or tape to a receptacle, a head movable into engagement with the strip to force the same into engagement with the receptacle, and a blade mounted directly upon the head and movable therewith to cut the strip.

14. In a machine for applying a flexible strip or tape to a receptacle, a moving support, a receptacle holding device mounted upon the moving support to move therewith and turn upon its axis with relation thereto, a supporting member mounted upon the moving support to move therewith and turn upon its axis with relation thereto, means carried by the supporting member and movable into engagement with the strip for forcing the strip into engagement with the receptacle, and means for holding the receptacle holding device and the supporting member against turning movement upon their axes with relation to the moving support during a portion of their movement with the moving support and subsequently causing the receptacle holding device and supporting member to turn upon their axes.

15. In a machine for applying a flexible strip or tape to a receptacle, a moving support, a receptacle holding device mounted upon the moving support to move therewith and turn upon its axis with relation thereto, a supporting member mounted upon the moving support to move therewith and turn upon its axis with relation thereto, means carried by the supporting member and movable into engagement with the strip for forcing the strip into engagement with the receptacle, means for holding the receptacle holding device and the supporting member against turning movement upon their axes with relation to the moving support during a portion of their movement with the moving support and subsequently causing the receptacle holding device and the supporting member to turn upon their axes, and means for having holding engagement with the strip and mounted upon the moving support and having a yielding action toward the receptacle as the strip is wound upon the receptacle.

16. In a machine for applying a flexible strip or tape to a receptacle, a moving support, spaced receptacle holding devices mounted upon the moving support to move therewith and turn upon their axes with relation thereto, means to guide the strip, means for coaction with each receptacle holding device to engage the strip and press the same into engagement with the receptacle, a device to grip the strip and coacting with each receptacle holding device and mounted upon the moving support to move therewith and movable toward and from the receptacle holding device, yielding means to oppose the movement of the strip gripping device toward its receptacle holding device, and means to cut the strip at the rear of the strip gripping device.

17. In a machine for applying a flexible strip or tape to a receptacle, a moving support, spaced receptacle holding devices mounted upon the moving support to move therewith and turn upon their axes with relation thereto, means to guide the strip, a plurality of devices corresponding in number and arrangement to the receptacle holding devices and adapted to engage the strip and force the same into engagement with the receptacles, a plurality of strip gripping devices corresponding in number and arrangement to the receptacle holding devices and movable toward the same, yielding means to oppose the movement of the strip gripping devices toward the receptacle holding devices, means to cut the strip, and means to turn the receptacle holding devices upon their axes.

18. In a machine for applying a flexible strip or tape to a receptacle, a moving support, spaced receptacle holding devices mounted upon the moving support to move therewith and turn upon their axes with relation thereto, means to guide the strip, a plurality of devices mounted upon the moving support and corresponding in number to the receptacle holding devices and adapted to force the strip into engagement with the receptacles, a plurality of strip gripping devices corresponding in number to the receptacle holding devices and movable toward the same, means to cut the strip, and means to turn the receptacle holding devices upon their axes.

19. In a machine for applying a flexible strip or tape to a receptacle, a moving support, spaced receptacle holding devices mounted upon the moving support to move therewith and turn upon their axes with relation thereto, means to guide the strip, a plurality of devices mounted upon the moving support and corresponding in number to the receptacle holding devices and adapted to press the strip upon the receptacles, a plurality of strip gripping devices corresponding in number to the receptacle holding devices and mounted upon the moving support and having yielding movement toward the receptacle holding devices, and a cutter carried by each strip pressing device, and means to turn the receptacle holding devices upon their axes.

20. In a machine for applying a flexible strip or tape to a receptacle, a moving support, spaced receptacle holding devices mounted upon the moving support to move therewith and turn upon their axes with relation thereto, means to guide the strip, a plurality of devices mounted upon the moving support and corresponding in number to the receptacle holding devices and adapted to press the strip upon the receptacles, a plurality of strip gripping devices corresponding in number to the receptacle holding devices and pivotally mounted upon the moving support and movable toward and from the receptacle holding devices, a spring to oppose the movement of each pivoted strip gripping device toward its corresponding receptacle holding device, cam operated means to swing the strip gripping device in an opposite direction, means to cut the strip, and means to turn the receptacle holding devices upon their axes.

21. In a machine for applying a flexible strip or tape to a receptacle, a moving support, spaced receptacle holding devices mounted upon the moving support to move therewith and turn upon their axes with relation thereto, means to guide the strip, a plurality of devices mounted upon the moving support and corresponding in number to the receptacle holding devices and adapted to press the strip upon the receptacle, a plurality of supporting elements corresponding in number to the receptacle holding devices and mounted upon the moving support and movable toward the receptacle holding devices, a strip gripping device mounted upon each supporting element and embodying a jaw shiftable to opened and closed positions, means to move the jaw to the opened and closed positions, means to cut the strip, and means to turn the receptacle holding devices upon their axes.

22. In a machine for applying a flexible strip or tape to a receptacle, means for holding a receptacle and turning the same upon its axis to wind the strip thereon, a support movable toward the receptacle holding means, a strip gripping device mounted upon the support and including a movable jaw shiftable to opened and closed positions, yielding means to shift the movable jaw to the closed position, and cam operated means to shift the jaw to the opened position.

23. In a machine for applying a flexible strip or tape to a receptacle, means for holding a receptacle and turning the same upon its axis to wind the strip thereon, a swinging support movable toward the receptacle holding means, a strip gripping device mounted upon the swinging support and including a stationary jaw and a coacting pivoted jaw, a bell crank lever pivotally mounted upon the swinging support, connecting means between the bell crank lever and the pivoted jaw, a spring to move the bell crank lever in one direction, and cam operated means to move the bell crank lever in the opposite direction.

24. In a machine for applying a flexible strip or tape to a receptacle, a moving support, means to continuously drive the moving support, a plurality of spaced receptacle receiving pockets mounted upon the moving support to move therewith and turn upon their axes with relation thereto, each pocket having its leading end and outer side open when in the receptacle receiving position, means to guide the strip, a device cooperating with each pocket to engage the strip and press the same to the receptacle, the device of the leading receptacle coacting with the strip guiding means to so support the strip that the next trailing receptacle will have its outer side brought into contact with the strip, means to cause the pockets to be held against turning movement upon their axes as they reach the receptacle receiving position and pass beyond such position for a selected distance and subsequently causing the pockets to be turned upon their axes, a strip gripping device mounted upon the moving support for coaction with each pocket, means to cut the strip, and an injector to move the receptacle into the open outer side of the pocket when the pocket reaches the receptacle receiving position.

25. In a machine for applying a flexible strip or tape to receptacles, a moving support, means to continuously drive the moving support, a plurality of spaced receptacle receiving pockets mounted upon the moving support, each pocket having its leading end and outer side open when in the receptacle receiving position, means to cause the strip to contact with the outer side of each receptacle when it reaches a selected position and to be wound upon the receptacle, and an injector movable transversely of each pocket when the pocket reaches the receptacle receiving position to feed the receptacle into the pocket through the open outer side of the pocket.

26. In a machine for applying a flexible strip or tape to receptacles, a moving support, means to continuously drive the moving support, a plurality of spaced receptacle receiving pockets mounted upon the moving support to move therewith and turn upon their axes with relation thereto, each pocket having one end and one side open, means to hold each pocket against turning movement upon its axis with relation to the moving support during a portion of its movement with the moving support so that the open end of such pocket is in the leading position and the open side is in the outer position when such pocket reaches the receptacle receiving position and the strip contacting position and travels for a substantial distance beyond the strip contacting position, means to then turn each pocket upon its axis for winding the strip thereon, a device coacting with each pocket for engaging the strip and pressing the same to the receptacle, a strip guide, the device of the leading pocket coacting with the strip guide for supporting the strip so that the next trailing receptacle will contact with the strip when it reaches the strip contacting position, a strip gripping device for coaction with each pocket, means to cut the strip, a receptacle injector disposed at the receptacle receiving position and movable transversely of the pocket to shift the receptacle therein through the open side, a spring pressed gate hinged to the injector at its leading end and opening in the direction of travel of the pocket, and means to move the injector.

27. In a machine for applying a flexible strip or tape to receptacles, a plurality of receptacle receiving pockets, each pocket having one end open and one side open, means to advance the pockets so that each pocket reaches a receptacle receiving position and a strip contacting position and passes beyond the contacting position for a substantial distance, means for holding each pocket against turning movement upon its axis so that its open end is in the leading position and its open side in the outer position when each pocket reaches the receptacle receiving position and the strip contacting position, means to turn each receptacle upon its axis when it travels a substantial distance beyond the strip contacting position, means for supporting the strip so that each receptacle will contact therewith when reaching the strip contacting position, and a movable injector to introduce the receptacle into each pocket through its outer open side when such pocket reaches the receptacle position, said injector having a yielding part near its leading end to cause the receptacle to move back into the closed trailing end of the pocket.

28. In a machine for applying a flexible strip or tape to receptacles, a moving support, a plurality of spaced receptacle holding devices mounted thereon to move therewith and turn on their axes with relation thereto, a device coacting with each receptacle holding device to engage the strip and press it to the receptacle, a guide element, tension regulating means supporting a reel of the strip, the strip being passed about the guide element, the strip engaging device of the leading receptacle holding device coacting with the guide element to support the strip so that the next receptacle will contact therewith when it reaches the strip contacting position, the strip being fed forwardly by its connection with the trailing receptacle, a device to grip the strip and movable toward each leading receptacle, means to cut the strip at the rear of the gripping device after the strip is gripped, and means to turn the receptacle holding devices upon their axes.

29. In a machine for applying a flexible strip or tape to receptacles, a moving support, a plurality of units carried by the moving support, each unit comprising a receptacle holding device mounted upon the support to move therewith and turn upon its axis in relation thereto, means to feed a receptacle into each receptacle holding device when such device reaches a receptacle receiving position, means to apply pressure to the receptacle fed into the receptacle holding device and to maintain such pressure until the receptacle holding device reaches the discharge position and then releasing such pressure, means for applying the strip to the receptacle when it reaches the strip contacting position, means for holding each receptacle holding device against turning movement upon its axis until the holding device has reached the strip contacting position and passed a substantial distance beyond the same and then turning each receptacle holding device upon its axis to wind the strip thereon, and a spring pressed ironing roller engaging the strip applied to the receptacle during the turning movement of the receptacle upon its axis, such roller serving to eject the receptacle when the discharge position is reached.

30. In a machine for applying a flexible strip or tape to receptacles, a rotatable shaft, spaced supports mounted upon the shaft to turn therewith, a plurality of receptacle holding devices mounted upon one support to travel therewith and turn upon their axes with relation thereto, a rigidly connected gear and locking wheel secured to each receptacle holding device to turn therewith, each locking wheel having a curved recess, oppositely arranged segmental rack and curved track arranged near the receptacle holding devices and held stationary, the gear engaging the segmental rack and the locking wheel the curved track, a plurality of supporting members corresponding in number and arrangement to the receptacle holding devices mounted upon the other support for movement therewith and for turning upon their axes with relation thereto, a rigidly connected gear and locking wheel secured to each supporting member to turn therewith, the last named locking wheel having a curved recess, an oppositely arranged segmental rack and curved track arranged near the supporting members and held stationary, the last named gear engaging the last named segmental rack and the last named locking wheel engaging the last named curved track, the two segmental racks substantially coinciding and the two curved tracks substantially coinciding so that the corresponding receptacle holding device and supporting member travel and turn in unison, means mounted upon each supporting member to engage the strip and press it against the receptacle, and means to feed a receptacle into each receptacle holding device when it reaches a selected point and is being held against turning movement upon its axis.

31. In a machine for applying a strip or tape to a receptacle, a support, a supporting member rotatably mounted upon the support, means mounted upon the supporting member to engage a strip and press the same into engagement with a can, and means having slidable engagement with the supporting member and adapted to have clamping engagement with the can.

32. In a machine for applying a strip or tape to a receptacle, a support, a supporting member rotatably mounted upon the support, means for holding a can in cooperative relation to the supporting member, means mounted upon the supporting member to engage a strip and press the same into engagement with the side of the can, and a spring pressed device having slidable engagement with the supporting member for clamping engagement with the lid of the can.

33. In a machine for applying a strip or tape to a receptacle, a support, a supporting member pivotally mounted upon the support and having an opening, means for holding a can in cooperative relation to the supporting member, means mounted upon the supporting member to engage a strip and press the same into engagement with the side of the can, and a spring pressed device slidably mounted within the opening of the supporting member for clamping engagement with the lid of the can.

34. In a machine for applying a strip or tape to a receptacle, a support, a supporting member having a tubular part rotatably mounted within the support, means to turn the tubular part, means for holding a can in cooperative relation to the supporting member, means mounted upon the tubular part to engage a strip and press the same into engagement with the side of the can, a spring pressed reciprocatory device slidably mounted within the tubular part to engage with the lid of the can and force the same to the closed position, means to hold the spring pressed reciprocatory device against turning movement upon its axis, and means to move said device from the lid of the can.

35. In a machine for applying a strip or tape to a receptacle, a support, an elongated member slidably mounted upon the support to move longitudinally with relation thereto, means to hold the elongated member against turning movement upon its axis with relation to the support, a spring to move the elongated member in one direction, an arm secured to the elongated member to move it in an opposite direction, a cam to move the arm, and a can engaging head rotatably mounted upon the elongated member.

36. In a machine for applying a flexible strip or tape to a receptacle, a supporting member, a spring actuated arm movably mounted upon the supporting member and having a head to engage with the strip and move the same into contact with the receptacle, and means to move the arm in opposition to the spring.

THOMAS H. NIFONG.